US011832123B2

(12) United States Patent
Gangakhedkar et al.

(10) Patent No.: US 11,832,123 B2
(45) Date of Patent: Nov. 28, 2023

(54) TIME-AWARE QUALITY-OF-SERVICE IN COMMUNICATION SYSTEMS

(71) Applicant: Huawei Technologies Co., Ltd., Shenzhen (CN)

(72) Inventors: Sandip Gangakhedkar, Munich (DE); Hanwen Cao, Munich (DE); Josef Eichinger, Munich (DE); Qing Wei, Munich (DE); Hui Ni, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 140 days.

(21) Appl. No.: 17/176,362

(22) Filed: Feb. 16, 2021

(65) Prior Publication Data

US 2021/0243641 A1 Aug. 5, 2021

Related U.S. Application Data

(63) Continuation of application No. PCT/EP2018/071988, filed on Aug. 14, 2018.

(51) Int. Cl.
*H04W 28/02* (2009.01)
*H04L 47/2475* (2022.01)
(Continued)

(52) U.S. Cl.
CPC ..... *H04W 28/0268* (2013.01); *H04L 47/2475* (2013.01); *H04L 47/28* (2013.01); *H04W 28/24* (2013.01)

(58) Field of Classification Search
CPC ... H04W 28/0268; H04W 28/24; H04W 4/24; H04L 47/2475; H04L 47/28; H04L 67/61;
(Continued)

(56) References Cited

U.S. PATENT DOCUMENTS 7,849,217 B2 12/2010 Meier
2004/0122651 A1 6/2004 Herle
(Continued)

FOREIGN PATENT DOCUMENTS

CN 1934837 A 3/2007
CN 101207611 A 6/2008
(Continued)

OTHER PUBLICATIONS

"3rd Generation Partnership Project; Technical Specification Group Services and System Aspects; Policy and Charging Control Framework for the 5G System; Stage 2 (Release 15)," 3GPP TS 23.503 V15.2.0, total 67 pages, 3rd Generation Partnership Project, Valbonne, France (Jun. 2018).

(Continued)

*Primary Examiner* — Abdullahi Ahmed
(74) *Attorney, Agent, or Firm* — Leydig, Voit & Mayer, Ltd.

(57) ABSTRACT

A device translates between a first communication network, in particular a deterministic communication network, and a second communication network, in particular a mobile communication network, in particular a 5G communication network. The device is configured to execute an application function that is configured to translate between Quality-of-Service, QoS, parameters of the first communication network and QoS parameters of the second communication network. A QoS profile includes the QoS parameters of the first communication network translated by the application function and, optionally, additional QoS parameters originating from the second communication network. The device is further configured to execute a signaling procedure configured to exchange the translated QoS parameters within the second communication network.

30 Claims, 17 Drawing Sheets

(51) Int. Cl.
*H04L 47/28* (2022.01)
*H04W 28/24* (2009.01)

(58) Field of Classification Search
CPC ..... H04L 47/2416; H04L 69/08; H04L 67/12; H04L 65/80; H04L 65/1063; H04L 12/1407; H04L 67/306; H04M 15/66; H04M 15/8016; H04M 15/8033; H04M 15/00
See application file for complete search history.

(56) References Cited

U.S. PATENT DOCUMENTS

| | | | |
|---|---|---|---|
| 2006/0153079 A1* | 7/2006 | Yoon | H04W 28/26 370/235 |
| 2008/0299911 A1 | 12/2008 | Chen et al. | |
| 2011/0090902 A1 | 4/2011 | Jung | |
| 2011/0167471 A1 | 7/2011 | Riley et al. | |
| 2014/0226522 A1 | 8/2014 | Anandappan et al. | |
| 2015/0195374 A1 | 7/2015 | Wang et al. | |
| 2018/0302330 A1* | 10/2018 | Bush | H04L 47/28 |
| 2018/0316557 A1* | 11/2018 | Frangieh | H04L 67/34 |
| 2019/0322298 A1* | 10/2019 | Mong | B61L 23/005 |
| 2020/0137615 A1* | 4/2020 | Joseph | H04W 24/02 |
| 2020/0412638 A1* | 12/2020 | Mehmedagic | H04L 45/3065 |
| 2021/0204172 A1* | 7/2021 | Rost | H04L 41/5009 |

FOREIGN PATENT DOCUMENTS

| | | |
|---|---|---|
| CN | 101242568 A | 8/2008 |
| CN | 101753429 A | 6/2010 |
| CN | 101854732 A | 10/2010 |
| CN | 101981963 A | 2/2011 |
| CN | 205005075 U | 1/2016 |
| CN | 105794263 A | 7/2016 |
| CN | 106357716 A | 1/2017 |

OTHER PUBLICATIONS

"Information technology—Telecommunications and information exchange between systems—Local and metropolitan area networks—Specific requirements—Part 1Q: Bridges and bridged networks, Amendment 3: Enhancements for scheduled traffic," ISO/IEC/IEEE 8802-1Q, International Standard, total 62 pages (Jul. 2017).
"3rd Generation Partnership Project; Technical Specification Group Services and System Aspects; Study on 5GS Enhanced support of Vertical and LAN Services; (Release 16)," 3GPP TR 23.734 V0.1.0, total 12 pages, 3rd Generation Partnership Project, Valbonne, France (Jul. 2018).
"3rd Generation Partnership Project; Technical Specification Group Services and System Aspects; System Architecture for the 5G System; Stage 2 (Release 15)," 3GPP TS 23.501 V15.2.0, total 217 pages, 3rd Generation Partnership Project, Valbonne, France (Jun. 2018).
"3rd Generation Partnership Project; Technical Specification Group Services and System Aspects; Service performance and network performance requirements for cyber-physical control applications in vertical domains; Stage 1 (Release 16)," 3GPP TS 22.804 V1.1.0, total 10 pages (May 2018).
"3rd Generation Partnership Project; Technical Specification Group Services and System Aspects; Procedures for the 5G System; Stage 2 (Release 15)," 3GPP TS 23.502 V15.2.0, total 308 pages, 3rd Generation Partnership Project, Valbonne, France (Jun. 2018).
"3rd Generation Partnership Project; Technical Specification Group Services and System Aspects; Service requirements for the 5G system; Stage 1 (Release 16)," 3GPP TS 22.261 V16.4.0, total 55 pages, 3rd Generation Partnership Project, Valbonne, France (Jun. 2018).
"3rd Generation Partnership Project; Technical Specification Group Services and System Aspects; Study on Communication for Automation in Vertical Domains (Release 16)," 3GPP TR 22.804 V2.0.0, total 188 pages, 3rd Generation Partnership Project, Valbonne, France (May 2018).
"3rd Generation Partnership Project; Technical Specification Group Services and System Aspects; Feasibility Study on LAN Support in 5G (Release 16)," 3GPP TR 22.821 V2.0.0, total 52 pages, 3rd Generation Partnership Project, Valbonne, France (Mar. 2018).
"3rd Generation Partnership Project; Technical Specification Group Services and System Aspects; Feasibility Study on LAN Support in 5G (Release 16)," 3GPP TR 22.821 V16.1.0, total 52 pages, 3rd Generation Partnership Project, Valbonne, France (Jun. 2018).
"3rd Generation Partnership Project; Technical Specification Group Services and System Aspects; Policy and charging control architecture (Release 15)," 3GPP TS 23.203 V15.3.0, total 262 pages, 3rd Generation Partnership Project, Valbonne, France (Jun. 2018).
"3rd Generation Partnership Project; Technical Specification Group Services and System Aspects; System Architecture for the 5G System; Stage 2 (Release 15)," 3GPP TS 23.501 V15.1.0, total 201 pages, 3rd Generation Partnership Project, Valbonne, France (Mar. 2018).
"3rd Generation Partnership Project; Technical Specification Group Services and System Aspects; Study on enhancement of Ultra-Reliable Low-Latency Communication (URLLC) support in the 5G Core network (5GC) (Release 16)," 3GPP TR 23.725 V0.3.0, total 44 pages, 3rd Generation Partnership Project, Valbonne, France (Jul. 2018).
"3rd Generation Partnership Project; Technical Specification Group Core Network and Terminals; 5G System; Policy Authorization Service; Stage 3 (Release 15)," 3GPP TS 29.514 V15.0.0, total 74 pages, 3rd Generation Partnership Project, Valbonne, France (Jun. 2018).
Nokia et al.,"New SID on Enhanced support of Vertical and LAN Services," SA WG2 Meeting #S2-127bis, Newport Beach, United States, S2-186182, total 3 pages (May 28-Jun. 1, 2018).
"IEEE Standard for Local and metropolitan area networks—Bridges and Bridged Networks; Amendment 25: Enhancements for Scheduled Traffic," IEEE Std 802.1Qbv™—2015, IEEE Computer Society, total 57 pages (2015).
Farkas et al.,"IEEE 802.1 Time-Sensitive Networking (TSN)," IETF 99—Tutorial, total 55 pages (Jul. 16, 2017).

* cited by examiner

| 5QI value | Resource Type | Starting time | Period | Data Volume | Priority Level | Packet Delay Budget | Packet Error Rate | Default Averaging Window | Example services |
|---|---|---|---|---|---|---|---|---|---|
| 76 | Time-triggered | T0 | 10ms | 100kB | 1 | 2ms | $10^{-6}$ | N.A. | TSN data flows |
| 77 | | T1 | 10ms | 20kB | 2 | 0.5ms | $10^{-6}$ | N.A. | Closed-loop control |
| 78 | | T3 | 2ms | 45kB | 3 | 0.25ms | $10^{-5}$ | N.A. | -- |

1100

1101 — New Resource Type

1102 — Absolute timestamp (obtained from TSN) for start of TSN data flow 1103, 1104 — Obtained from TSN Configuration 1105 — Ex. PCP field in 802.1Q frame 1106, 1107, 1108 — Obtained from TSN Configuration TSN-specific range

Fig. 11

TIME-AWARE QUALITY-OF-SERVICE IN COMMUNICATION SYSTEMS

CROSS-REFERENCE TO RELATED APPLICATIONS

This application is a continuation of International Application No. PCT/EP2018/071988, filed on Aug. 14, 2018, the disclosure of which is hereby incorporated by reference in its entirety.

FIELD

The present disclosure relates to time-aware Quality-of-Service (QoS), in particular techniques for providing time-aware QoS in communication systems such as 5G NR (New Radio).

BACKGROUND

Vertical industries like factory automation, automotive, etc. are highly interested in networking solutions that achieve real-time deterministic communication, which essentially provides bounds on latency, packet loss, packet delay variation (i.e. jitter), and high reliability. A deterministic system is a system in which no randomness is involved in the development of future states of the system. A deterministic model will thus always produce the same output from a given starting condition or initial state. Hence, deterministic networks provide a deterministic model of communication, by specifying a deterministic or time-sensitive Quality of Service (QoS) model. Additionally, such networks are required to support both time-critical (i.e. deterministic) as well as non-critical data flows using the same physical infrastructure.

Today, there exist several standards targeting deterministic networking at various layers of the OSI stack. Some prominent examples are IETF's Deterministic Networking (DetNet) Working Group, which focuses on Layer-3 aspects and IEEE's Time Sensitive Networking (TSN) Task Group, which focuses on the Layer 2 (IEEE802.1) aspects.

The evolving 5G mobile communication standard aims to support new and diverse vertical industry use-cases and requirements beyond conventional mobile telephony. Recent developments in 3GPP's 5G New Radio (NR) standardization show a strong interest in supporting real-time, deterministic communication (based on IEEE802.1/Ethernet) in future releases. Particularly, for incremental wireline-to-wireless migration in high-performance manufacturing, one can expect that individual wireline links or stars in the Ethernet network are replaced with 5G. From the perspective of the Ethernet network, the end-points of the 5G PDU-session align with the end points of the Ethernet link. Therefore, TSN specifications logically apply to the end-to-end PDU-session. As Ethernet nodes support managed objects for the configuration of time-aware scheduling, the corresponding enhancements for the configuration of time-aware scheduling for 5G are necessary.

SUMMARY

The disclosure provides efficient techniques for translating between requirements, such as QoS requirements of a mobile communication network, in particular a 5G NR network, and a deterministic communication network, in particular based on time sensitive networking (TSN). The disclosure enables the seamless replacement of wired TSN-compliant Ethernet links with wireless 5G links with corresponding time-aware capabilities/enhancements.

The disclosure described hereinafter includes solutions for three aspects related to the above-described improvements.

A first aspect of the present disclosure is related to a lack of deterministic Quality of Service definition in cellular wireless standards. Mobile communication traditionally offers best-effort QoS for supporting voice and internet services, with more relaxed latency and reliability requirements compared to those of real-time deterministic networking. Accordingly, the QoS model of cellular wireless standards, like 3G, 4G, 5G, etc., does not allow for deterministic communication. The primary reason for this is the inherently stochastic nature of a wireless channel, which makes it very challenging to provide strict bounds on the QoS of wireless communication. The QoS model in 5G is fundamental to the system performance as it dictates what capabilities the 5G network can provide to the application. Without a QoS model that can completely specify the requirements of deterministic communication, there is no way for 5G to fully support the range of use-cases requiring deterministic communication.

A second aspect of the present disclosure is related to interfacing to time-sensitive Ethernet networks. In order to support seamless interworking of 5G and Ethernet for time-sensitive networking, it is necessary to define the interfaces and entities within the 5G system to understand, interpret, negotiate, and trigger actions with the Ethernet network, particularly in relation to the time-sensitive QoS to be provided to the latter. The 5G Core Network (CN) defines the so-called Application Function (AF) to handle application-specific functionalities within the 5G system. However, due to the particular nature of time-sensitive traffic flows, appropriate procedures should be defined between the AF and the Ethernet network to enable seamless interworking. FIG. 1 shows the integration of 5G wireless network with a time-critical wired network.

A third aspect of the present disclosure is related to internal 5G procedures to support end-to-end time-sensitive traffic flows. Procedures for setting up end-to-end communication sessions for time-sensitive traffic in 5G are likely different due to the requirements of deterministic QoS. Specifically, the 5G CN (5G Core Network) negotiates the guaranteed QoS with the relevant Application Function in order to ensure that the QoS provided by the network matches the QoS desired by the application and also to avoid overprovisioning the system. Additionally, the Radio Access Network (RAN) should be configured appropriately to satisfy the deterministic QoS requirement which requires negotiation with the 5G CN (due to resource reservation, admission control etc.).

A concept of the disclosure, as described hereinafter, is a QoS framework in mobile communication networks, in particular 5G, that supports time-triggered or deterministic traffic and includes the following components/aspects:

1) Time Sensitive Application Function (TS AF): Located in the 5G Core Network, this AF interacts with the 5G CN to support the time-sensitive application, in particular, influences: 1) traffic treatment (via. Session Management Function (SMF), User Plane Function (UPF), and RAN), 2) policy control (via. Policy Control Function (PCF)) and 3) service exposure (via. Network Exposure Function (NEF)).

2) Time-Sensitive QoS Profile: A new QoS profile definition that includes time-sensitive parameters namely traffic triggering/starting time, traffic duration and volume, as well as mapping existing 5G QoS profile parameters to additional time-sensitive QoS parameters.

3) Procedures to enable end-to-end communication for time sensitive traffic: Signaling procedures between the 5G CN and TS-AF, as well as 5G (R)AN and 5G CN to support end-to-end time-sensitive traffic flows in the 5G system.

The disclosed QoS framework and schemes are of particular relevance to 5G NR standardization.

In the disclosure, deterministic communication networks are described. Deterministic communication networks provide deterministic data traffic, i.e. data traffic which traffic characteristics are predefined or known a priori. For example, traffic parameters as shown in FIG. 2 are predetermined, e.g. parameters such as maximum Data rate R, data rate variation $\Delta R$, triggering/starting time(s) $t_0$, $t_1$, triggering/starting time variation $\Delta t_0$, $\Delta t_1$, traffic duration(s) $\delta_0$, $\delta_1$, traffic duration(s) variation $\Delta \delta_0$, $\Delta \delta_1$, period of traffic pattern P, cycle Start Time $T_{cycle\_start}$, etc.

In a deterministic network or communication network, these time-sensitive QoS characteristics are known in advance (prior to the cycle start time) in order for the network to take the appropriate steps to meet the associated QoS requirements. The traffic pattern may not be cyclic in which case the period P specifies the total duration of the traffic pattern and may be updated on-demand but always in advance to the starting time of the next pattern. A time-sensitive network is one example of a deterministic network.

In order to describe the present disclosure in detail, the following terms, abbreviations and notations will be used:

| | |
|---|---|
| UE: | User Equipment |
| BS: | Base Station, gNodeB, eNodeB |
| NR: | New Radio (standard) |
| QoS: | Quality-of-Service |
| 5GS: | 5G System |
| 5GC: | 5G Core (Network) |
| 5QI: | 5G QoS Indicator |
| AF: | Application Function |
| AMF: | Access Management Function |
| CN: | Core Network |
| DN: | Data Network |
| E2E: | End to end |
| EP | End Point |
| R(AN): | Radio (Access Network) |
| NEF: | Network Exposure Function |
| PCF: | Policy Control Function |
| PDU: | Protocol Data Unit |
| SMF: | Session Management Function |
| TN | Transport Network |
| TS: | Time sensitive |
| TSN: | Time sensitive networking |
| UPF: | User Plane Function |

According to a first aspect, the disclosure relates to a device for translating between a first communication network, in particular a deterministic communication network, and a second communication network, in particular a mobile communication network, in particular a 5G communication network. The device comprises: an application function (e.g., is configured to execute the application function) that is configured to translate between Quality-of-Service, QoS, parameters of the first communication network and QoS parameters of the second communication network. A QoS profile includes the QoS parameters of the first communication network translated by the application function and, optionally, additional QoS parameters originating from the second communication network. The device further comprises (e.g., is configured to execute) a signaling procedure configured to exchange the translated QoS parameters within the second communication network.

Such a device provides the following advantages: adequate QoS profile definition; seamless integration into legacy networks, e.g. legacy time-sensitive networks; and coordination of the second communication network for traffic requirements of the first communication network.

In particular for the first communication network being a deterministic or time-sensitive communication network and the second communication network being a 5G communication network, the following advantages can be provided:

1) TS QoS Profile definition: The disclosed TS QoS profile captures the essential characteristics of TS traffic as well as the associated QoS requirements. This addresses a gap in the existing 5G QoS model for time-triggered traffic.

2) Seamless integration into legacy time-sensitive networks: The disclosed solution enables a 5G network to support time-sensitive data traffic in a seamless manner by defining the essential signaling between the TS AF and the external TS network.

3) Coordination of 5GC and 5G (R)AN for TS traffic: By defining the procedures between the TS AF, 5GC and 5G (R)AN needed to setup and maintain an E2E data flow for time-sensitive traffic, the key 5G internal signaling is covered.

In an exemplary implementation form of the device, the signaling procedure is further configured to trigger establishment of a deterministic traffic flow based on the QoS profile.

This provides the advantage that a deterministic traffic flow can be set up in a mobile communication network.

In an exemplary implementation form of the device, the application function is configured to negotiate the QoS profile with the second communication network, in particular a policy control function, PCF, of the 5G communication network, in order to ensure that the second communication network can satisfy the QoS parameters of the first communication network translated by the application function.

This provides the advantage that a deterministic traffic flow can be set up in a mobile communication network, which satisfies the QoS parameters of the deterministic communication network.

In an exemplary implementation form of the device, the application function is configured to translate the negotiated QoS profile for the first communication network.

This provides the advantage that the negotiated QoS profile can be used in the first communication network.

In an exemplary implementation form of the device, the QoS parameters of the first communication network comprise at least one of the following: periodicity of deterministic traffic flow, maximum data rate of the deterministic traffic flow as inferred from a received configuration, in particular, a Gate Parameter Table, data rate variation of the deterministic traffic flow, starting times of the deterministic traffic flow, starting time variation of the deterministic traffic flow, duration the deterministic traffic flow, duration variation of the deterministic traffic flow, reception window of the deterministic traffic flow.

This provides the advantage that specific QoS parameters of a deterministic traffic flow can be translated for usage in a mobile communication network.

In an exemplary implementation form of the device, the application function provides an interface to the first communication network, in particular to a configuration entity of the first communication network, for receiving the QoS parameters of the first communication network. The application function provides an interface to the second communication network, in particular to a PCF of the 5G communication network or via a network exposure function, NEF, to the PCF to provide the QoS profile.

This provides the advantage that the interface can be used to couple the first communication network with the second communication network.

An interaction between PCF and AF can be via a direct interface or a via network exposure function (NEF). Reference procedure in 3GPP TS 23.501 v2.0 chapter 5.6.7 describes application function influence on traffic routing: "Based on operator deployment, Application Functions considered to be trusted by the operator can be allowed to interact directly with relevant Network Functions. Application Functions not allowed by the operator to access directly the Network Functions shall use the external exposure framework via the NEF to interact with relevant Network Functions".

In an exemplary implementation form of the device, the application function is configured to receive an acceptance message from the PCF if the second communication network can accept the QoS profile; and the application function is configured to transmit a QoS configuration comprising the translated QoS parameters to the deterministic network based on the accepted QoS profile.

This provides the advantage that the application function is able to control translation of the QoS parameters between both networks.

In an exemplary implementation form of the device, the application function is configured to receive a rejection message and/or a modified QoS profile from the PCF if the second communication network rejects the QoS profile; and the application function is configured to transmit the rejection message and/or the translated QoS parameters corresponding to the modified QoS profile to the deterministic network.

This provides the advantage that the application function is able to control translation of the QoS parameters between both networks and if necessary, can reject the translation of the QoS parameters.

In an exemplary implementation form of the device, the application function is configured to transmit a request to the PCF, wherein the request comprises the modified QoS profile if the first communication network confirms the translated QoS parameters corresponding to the modified QoS profile.

This provides the advantage that the application function is able to provide a modification of the QoS profile in order to enable translation between both communication networks.

In an exemplary implementation form of the device, the PCF is configured to signal a policy related to the QoS profile or the at least one modified QoS profile to a Session Management Function, SMF, and/or to a User Equipment, UE, of the 5G communication network to influence a User Plane Function, UPF, and a Radio Access Network, RAN.

This provides the advantage that the PCF can influence the UPF and the RAN depending on the QoS profile or modified QoS profile.

The modified QoS refers to the actual implementation of PCF of the agreed QoS profile with the AF at different parts or entities of the network (e.g., RAN, TN, CN).

1) The PCF modifies the QoS Profile it receives from the AF by adjusting the parameters according to the conditions of the Transport (UPF—RAN) and radio (RAN—UE) links.

2) The standard provides means for exchanging policy-related information between the PCF and the SMF, between the SMF and the UPF and the SMF and the (R)AN.

In an exemplary implementation form of the device, the PCF is configured to signal the QoS profile or the modified QoS profile to the SMF to transmit information based on the QoS profile or the at least one modified QoS profile to a Radio Access Network (RAN) entity to influence resources reservation of the RAN; and the PCF is configured to receive a message from the SMF, the message comprising the QoS profile or the at least one modified QoS profile accepted by the second communication network or a rejection by the second communication network.

This provides the advantage that the PCF can influence resources reservation of the RAN depending on the QoS profile or the modified QoS profile, which provides flexibility for network configuration.

The modified QoS profile can be a new QoS profile proposed by the PCF, e.g. upon a feasibility check of a QoS profile received from the AF. If the original QoS profile is not feasible for the PCF, it may modify the original QoS profile such that the modified QoS profile has QoS parameters that are feasible for the PCF.

In an exemplary implementation form of the device, the first communication network comprises Time Sensitive Networking, TSN, in particular according to the IEEE 802.1Qbv specification.

This provides the advantage that QoS requirements of TSN, e.g. automation networks can be translated to QoS parameters of 5G networks. This allows integration of TSN in 5G networks.

In an exemplary implementation form of the device, the QoS parameters of the TSN are derived from Gate Control Lists, GCLs, or Gate Parameter Tables of TSN switches of the TS network or signaled in alternative format.

This provides the advantage that the QoS parameters of the TSN are available for translation by the device.

In an exemplary implementation form of the device, the QoS parameters of the TSN comprise at least one of the following: time-triggered or deterministic resource type, absolute time stamp for start of TSN data flow or a relative time offset to an absolute starting time, optionally a period of the TSN data flow, and data volume or data rate of the TSN data flow.

This provides the advantage that QoS parameters specific for TSN can be integrated in 5G networks.

In an exemplary implementation form of the device, the application function may provide an interface to the TS network, in particular to a configuration entity of the TS network, for receiving a GCL of the TS network; the application function may provide an interface to the second communication network, in particular a PCF of the 5G communication network to provide the QoS profile related to the TS network.

This provides the advantage that the TS network can be easily integrated with a mobile network by using such device.

In an exemplary implementation form of the device, the application function may be configured to receive an acceptance message from the PCF if the second communication network can accept the QoS profile related to the TS network; the application function may be configured to generate a GCL from the accepted QoS profile related to the TS network and to transmit the generated GCL to the TS network.

This provides the advantage that the device can flexibly decide whether or not to include the TS specific QoS parameters.

According to a second aspect, the disclosure relates to a Policy Control Function, PCF, network entity, configured to:

receive a QoS profile from a device, in particular an Application Function, AF, network entity. The QoS profile comprises QoS parameters of a first communication network, in particular a deterministic communication network, translated by the AF network entity into QoS parameters of a second communication network, in particular a mobile communication network, and additional QoS parameters originating from the second communication network. The PCF network entity is further configured to transmit an acceptance message to the device upon acceptance of the received QoS profile.

Such a PCF network entity or simply referred to as PCF provides the following advantages: adequate QoS profile definition; seamless integration into legacy networks, e.g. legacy time-sensitive networks; and coordination of the second communication network for traffic requirements of the first communication network.

In an exemplary implementation form, the PCF network entity is configured to transmit a modified QoS profile to the device upon rejection of the received QoS profile.

This provides the advantage that the PCF can flexibly decide whether to use the QoS profile or a modified QoS profile.

In an exemplary implementation form, the PCF network entity is configured to transmit a signal indicating a policy related to the QoS profile or at least one modified QoS profile to a Session Management Function, SMF, network entity.

This provides the advantage that the PCF can decide whether to transmit the QoS profile or a policy related to the QoS profile or one or more modified QoS profiles.

The signal is transmitted by the PCF to the SMF, and (optionally) to the UE. The SMF can influence a User Plane Function, UPF, and a Radio Access Network, RAN.

In an exemplary implementation form, the PCF network entity is configured to: transmit the QoS profile or the at least one modified QoS profile to the SMF to transmit information based on the QoS profile or the at least one modified QoS profile to a Radio Access Network (RAN) entity to influence resources reservation of the RAN; and receive a message from the SMF, the message comprising the QoS profile or the at least one modified QoS profile accepted by the second communication network or a rejection by the second communication network.

This provides the advantage that the PCF network entity can control resources reservation of the RAN based on the QoS requirements for both networks.

According to a third aspect, the disclosure relates to a Session Management Function, SMF, network entity, configured to: receive a policy related to a QoS profile from a Policy Control Function, PCF, network entity. The QoS profile comprises QoS parameters of a first communication network, in particular a deterministic communication network, translated by a device into QoS parameters of a second communication network, in particular a mobile communication network, and optionally, additional QoS parameters originating from the second communication network. The SMF network entity is further configured to select a User Plane Function, UPF, network entity based on the received policy related to the QoS profile from the PCF network entity.

Such a SMF network entity or simply referred to as SMF provides the following advantages: adequate QoS profile definition; seamless integration into legacy networks, e.g. legacy time-sensitive networks; and coordination of the second communication network for meeting traffic requirements of the first communication network.

In an exemplary implementation form, the SMF network entity is configured to: receive the QoS profile from the PCF network entity; modify the QoS profile based on the policy received from the PCF network entity; transmit the modified QoS profile to a Radio Access Network, RAN, entity to influence resources reservation of the RAN and or a UPF network entity; receive a message from the RAN and/or a UPF indicating an acceptance or rejection of the QoS profile; transmit information about rules to the RAN based on the policy received from the PCF network entity; and/or transmit the modified QoS profile and/or the policy to the UPF network entity.

There are two modifications to the QoS Profile: first by the PCF and second by the SMF. The modification by the SMF depends on the QoS Policy provided by the PCF.

Transmitting the Policy related to the QoS Profile implies transmitting information about rules based on the policy.

According to a fourth aspect, the disclosure relates to a Radio Access Network, RAN, entity, configured to: receive a QoS profile and/or related QoS rules, in particular from a Session Management Function, SMF, network entity. The QoS profile comprises QoS parameters of a first communication network, in particular a deterministic communication network, translated by a device into QoS parameters of a second communication network, in particular a mobile communication network, and optionally, additional QoS parameters originating from the second communication network. The RAN entity is further configured to reserve resources of the RAN entity based on the received QoS profile.

Such a RAN entity or simply referred to as RAN provides the following advantages: adequate QoS profile definition; seamless integration into legacy networks, e.g. legacy time-sensitive networks; and coordination of the second communication network for traffic requirements of the first communication network.

Multiple QoS Rules, QoS Flow level QoS parameters if needed for the QoS Flow(s) associated with those QoS rule(s) and QoS Profiles may be included in the PDU Session Establishment Accept within the N1 SM and in the N2 SM information, e.g. according to 3GPP TS 23.502, FIG. 4.3.2.2.1-1 step 11.

In an exemplary implementation form, the RAN entity is configured to transmit a message to the SMF network entity, wherein the message indicates an acceptance or rejection of the QoS profile.

According to a fifth aspect, the disclosure relates to a User Equipment, UE, of a second communication network, in particular a mobile communication network, in particular a 5G communication network, wherein the UE is configured to: transmit a request for packet data unit, PDU, session establishment to a network entity, in particular a SMF, via a network access entity, in particular a Radio Access Network, RAN and/or an AMF entity; receive a radio resources configuration from the network access entity, wherein the radio resources configuration is based on a QoS profile, wherein the QoS profile comprises QoS parameters of a first communication network, in particular a deterministic communication network, translated by a device into QoS parameters of a second communication network, in particular a mobile communication network, and optionally, additional QoS parameters originating from the second communication network.

Such a UE provides the following advantages: adequate QoS profile definition; seamless integration into legacy QoS profile definition; seamless integration into legacy networks, e.g. legacy time-sensitive networks; and coordination of the second communication network for traffic requirements of the first communication network.

In an exemplary implementation form, the UE is configured to establish an end-to-end deterministic traffic flow in the second communication network based on the QoS profile.

According to a sixth aspect, the disclosure relates to a User Plane Function, UPF, network entity, of a second communication network, in particular a mobile communication network, in particular a 5G communication network. The UPF network entity is an end-to-end, E2E, traffic flow terminating point in the second communication network to enforce QoS rules received by an SMF network entity, in particular an SMF network entity according the third aspect. The UPF network entity is configured to: establish an end-to-end deterministic traffic flow in the second communication network based on a QoS profile. The QoS profile comprises QoS parameters of a first communication network, in particular a deterministic communication network, translated by a device into QoS parameters of a second communication network, in particular a mobile communication network, and additional QoS parameters originating from the second communication network.

Such a UPF network entity or simply referred to as UPF provides the following advantages: adequate QoS profile definition; seamless integration into legacy networks, e.g. legacy time-sensitive networks; and coordination of the second communication network for traffic requirements of the first communication network.

The UPF is the terminating point of the E2E traffic flow in the 5G network (UE is the other terminating point). The UPF enforces the QoS rules according to the signal received by the SMF.

According to a seventh aspect, the disclosure relates to a method for translating between a deterministic communication network and a mobile communication network, in particular a 5G communication network. The method comprises: translating, by an application function, between Quality-of-Service, QoS, parameters of the deterministic communication network and QoS parameters of the mobile communication network; creating a QoS profile comprising the QoS parameters of the mobile communication network translated by the application function and, optionally, additional QoS parameters originating from the mobile communication network; and exchanging the translated QoS parameters within the mobile communication network in order to agree on the QoS profile to use for a deterministic traffic flow.

Such a method provides the following advantages: adequate QoS profile definition; seamless integration into legacy networks, e.g. legacy time-sensitive networks; and coordination of the second communication network for traffic requirements of the first communication network.

In particular for the first communication network being a deterministic or time-sensitive communication network and the second communication network being a 5G communication network, the following advantages can be provided:

TS QoS Profile definition: The disclosed TS QoS profile captures the essential characteristics of TS traffic as well as the associated QoS requirements. This addresses a gap in the existing 5G QoS model for time-triggered traffic.

Seamless integration into legacy time-sensitive networks: The disclosed solution enables a 5G network to support time-sensitive data traffic in a seamless manner by defining the essential signaling between the TS AF and the external TS network.

Coordination of 5GC and 5G (R)AN for TS traffic: By defining the procedures between the TS AF, 5GC and 5G (R)AN needed to setup and maintain an E2E data flow for time-sensitive traffic, the key 5G internal signaling is covered.

According to an eighth aspect, the disclosure relates to a computer program product including computer executable code or computer executable instructions that, when executed, causes at least one computer to execute the method according to the second aspect. Such a computer program product may include a non-transient readable storage medium storing program code thereon for use by a processor, the program code comprising instructions for performing the methods or the computing blocks as described hereinafter.

BRIEF DESCRIPTION OF THE DRAWINGS

Further embodiments of the present disclosure will be described with respect to the following figures, in which:

FIG. 11 shows a table illustrating an exemplary 5G TSN QoS profile for a single 802.1Qbv TSN flow according to the disclosure;

DETAILED DESCRIPTION

Figure 1:
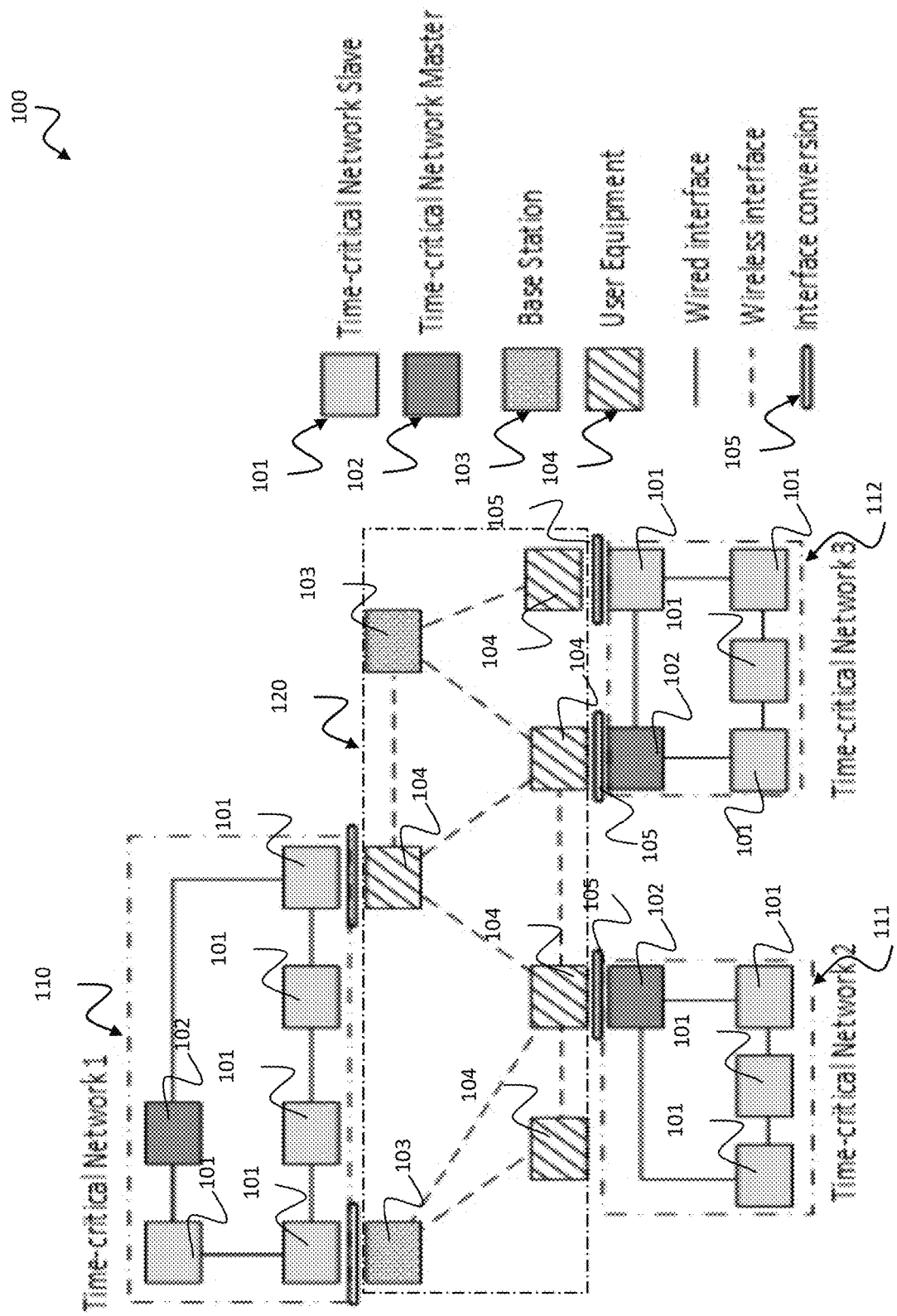
FIG. 1 shows a block diagram illustrating integration of 5G into a time-critical network.

In the following detailed description, reference is made to the accompanying drawings, which form a part thereof, and in which is shown by way of illustration exemplary aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The methods, devices, and systems described herein may particularly be implemented in wireless communication networks based on 5G NR (New Radio) mobile communication standards (and beyond) and in deterministic communication networks, e.g. time sensitive networking (TSN), for example according to IEEE standard 802.1Qbv. Such mobile communication networks may for example be designed according to the standards 3GPP TR 22.804 V2.0.0 (2018-05), Study on Communication for Automation in Vertical domains (CAV), 3GPP TR 22.821 V16.1.0 (2018-06) Feasibility Study on LAN Support in 5G, 3GPP TS 23.501 V15.2.0 (2018-06) System Architecture for the 5G System, etc. Such deterministic communication networks may for example be designed according to the IEEE standard 802.1Qbv™-2015, Amendment 25: Enhancements for Scheduled Traffic, IEEE Computer Society, etc.

The methods, devices, and systems described herein may also be implemented in wireless communication networks based on mobile communication standards such as LTE, in particular 3G, 4G, and 4.5G. The methods, devices, and systems described herein may also be implemented in wireless communication networks, in particular communication networks similar to WiFi communication standards according to IEEE 802.11. The described devices may include integrated circuits and/or passives and may be manufactured according to various technologies. For example, the circuits may be designed as logic integrated circuits, analog integrated circuits, mixed signal integrated circuits, optical circuits, memory circuits, and/or integrated passives.

The devices described herein may be configured to transmit and/or receive radio signals. Radio signals may be or may include radio frequency signals radiated by a radio transmitting device (or radio transmitter or sender). However, devices described herein are not limited to transmit and/or receive radio signals, also other signals designed for transmission in deterministic communication networks may be transmitted and/or received.

The devices and systems described herein may include processors or processing devices, memories and transceivers, i.e. transmitters and/or receivers. In the following description, the term "processor" or "processing device" describes any device that can be utilized for processing specific tasks (or blocks or steps). A processor or processing device can be a single processor or a multi-core processor or can include a set of processors or can include means for processing. A processor or processing device can process software or firmware or applications etc.

In the following, network nodes, elements and functions of the 5G mobile communication network are described.

The User Equipment (UE) represents the user equipment or client terminal or mobile communication device which can be operated by the subscriber to initiate communication in the 5G network, i.e. starting (mobile originating, MO) or accepting (mobile terminating, MT) a communication. The UE can also initiate communication without user interaction, e.g. it can be a machine terminal, e.g. for a car or a robot or other device.

The (R)AN ((radio) access network) represents the (radio) access network by which the UE obtains access to the 5G communication network. The RAN may include base station(s) to provide access to the network. Examples of a base station include access nodes, evolved NodeBs (eNBs), gNBs, NodeBs, master eNBs (MeNBs), secondary eNBs (SeNBs), remote radio heads and access points.

The AF (Application Function) network node provides application functions that enable certain services to be executed.

The Access and Mobility Management Function (AMF) network node represents the access and mobility management function. It manages the access and mobility functions of the UE. The AMF may also include network slice selection functionality.

The Session Management Function (SMF) network node represents the session management function. It sets up sessions and manages them according to the network policy.

The User Plane Function (UPF) network node represents the User Plane function. UPFs can be applied in various configurations and locations, according to the service type.

The Policy Control Function (PCF) network node represents the policy control function. It provides a policy framework that includes network slicing, roaming, and mobility management.

The UDM (Unified Data Management) network node provides a shared data management. This saves subscriber data and profiles. This is equivalent to the functionality of an HSS in 4G systems, but is used for both mobile and wired access in the NG Core network.

The DN (Data Network) node provides the data network over which data is transmitted, e.g. from one UE to another UE.

FIG. 1 shows a block diagram 100 illustrating integration of 5G into a time-critical network. The time critical network may include a first time critical network section 110, a second time critical network section 111, and a third time critical network section 112. Each of the time critical network sections 110, 111, 112 may include one or more time-critical network slaves 101 and one time-critical network master 102. The time-critical network 110, 111, 112 is coupled via interface converters 105 to a mobile communication network 120, e.g. a 5G network. The mobile communication network 120 comprises one or more base stations 103 and one or more User Equipments 104. The interface converters 105 may convert between a network slave 101 or a network master 102 of the time-critical network 110, 111, 112 and a base station 103 or a User Equipment 104 of the mobile communication network 120.

Support of real-time deterministic data traffic is a new feature for 3GPP. Today, there doesn't exist a solution in cellular radio to support time-aware communication. Nevertheless, there are some related aspects in current 3GPP systems and industrial networks as described in the following.

In 4G/5G QoS Model, QoS Class Identifier (QCI) is a mechanism used in 3GPP Long Term Evolution (LTE) networks to ensure bearer traffic is allocated appropriate Quality of Service (QoS). The QoS parameters include Guaranteed Bit Rate (GBR) or non-Guaranteed Bit Rate (non-GBR), Priority Handling, Packet Delay Budget and Packet Error Loss rate, as summarized in Table 1.

According to 3GPP TS 23.203, 15 QCIs in Release 14 are standardized and associated with QCI characteristics in terms of packet forwarding treatment that the bearer traffic receives end-to-end between the UE and the Packet Gateway (P-GW). In 3GPP TS 23.501, a concept called 5G QoS flow is defined as the finest granularity for QoS forwarding treatment in the 5G System. All traffic mapped to the same 5G QoS Flow receives the same forwarding treatment (e.g. scheduling policy, queue management policy, rate shaping policy, RLC configuration, etc.). Providing different QoS forwarding treatment requires separate 5G QoS Flow. The QCI is extended to the 5G QoS Indicator (5QI) which involves a new type of traffic Delay Critical GBR and specified maximum data burst volume.

TABLE 1

5G Qos Parameters according to Sec. 5.7.2, TS 23.501)
5G QoS Parameters

| Parameter | Full Name | Usage |
|---|---|---|
| 5QI | 5G QoS Identifier | References to 5G QoS characteristics applied in the (R)AN. |
| ARP | Allocation and Retention Priority | Contains information about the priority level, the pre-emption capability and the pre-emption vulnerability of QoS Flows (for admission control, resource pre-emption etc.) |
| RQA | Reflective QoS Attribute | Optional (used for Reflective QoS) |
| Notification Control | Notification Control | (Only for GBR Flows) Indicates whether notifications are requested from the RAN when the GFBR can no longer (or again) be fulfilled for a QoS Flow during the lifetime of the QoS Flow |

TABLE 1-continued

5G Qos Parameters according to Sec. 5.7.2, TS 23.501)
5G QoS Parameters

| Parameter | Full Name | Usage |
|---|---|---|
| Flow Bit Rates (GFBR, MFBR) | Guaranteed Flow Bit Rate, Maximum Flow Bit Rate | GFBR denotes the bit rate that may be expected to be provided by a GBR QoS Flow. The MFBR limits the bit rate that may be expected to be provided by a GBR QoS Flow. |
| Aggregate Bit Rates | Session Aggregate Maximum Bit Rate (Session-AMBR), per UE Aggregate Maximum Bit Rate (UE-AMBR). | The Session-AMBR limits the aggregate bit rate that can be expected to be provided across all Non-GBR QoS Flows for a specific PDU Session. The UE-AMBR limits the aggregate bit rate that can be expected to be provided across all Non-GBR QoS Flows of a UE. Both are measured over an AMBR averaging window which is a standardized value. |

The current 5G QoS characteristics are summarized in Table 2. These QoS characteristics are indexed by the aforementioned 5Q1.

TABLE 2

5G QoS Characteristics according to Sec. 5.7.3, TS 23.501
5G QoS Characteristics

| Resource Type | Can be GBR, delay critical GBR or Non-GBR |
|---|---|
| Priority level; | Used to differentiate between QoS Flows of the same UE, and it shall also be used to differentiate between QoS Flows from different UEs. |
| Packet Delay Budget (PDB); | Defines an upper bound for the time that a packet may be delayed between the UE and the UPF |
| Packet Error Rate (PER); | Defines an upper bound for a rate of non-congestion related packet losses. |
| Averaging window. | Only for GBR QoS Flows: represents the duration over which the GFBR and MFBR shall be calculated (e.g. (R)AN, UPF, UE) |
| Maximum Data Burst Volume | Only for 5QIs with 5G Access Network PDB <=20 ms |

The standardized 5Q1 to QoS characteristics mapping according to Table 5.7.4-1 in 3GPP TS 23.501 is summarized in Table 3 below.

TABLE 3

Standardized 5QI to QoS characteristics mapping (Table 5.7.4-1 in TS 23.501)

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| 1 | GBR NOTE 1 | 20 | 100 ms | $10^{-2}$ | N/A | 2000 ms | Conversational Voice |
| 2 | | 40 | 150 ms | $10^{-3}$ | N/A | 2000 ms | Conversational Video (Live Streaming) |
| 3 | | 30 | 50 ms | $10^{-3}$ | N/A | 2000 ms | Real Time Gaming, V2X messages Electricity distribution - medium voltage, Process automation-monitoring |

TABLE 3-continued

Standardized 5QI to QoS characteristics mapping (Table 5.7.4-1 in TS 23.501)

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| 4 | | 50 | 300 ms | $10^{-6}$ | N/A | 2000 ms | Non-Conversational Video (Buffered Streaming) |
| 65 | | 7 | 75 ms | $10^{-2}$ | N/A | 2000 ms | Mission Critical user plane Push To Talk voice (e.g., MCPTT) |
| 66 | | 20 | 100 ms | $10^{-2}$ | N/A | 2000 ms | Non-Mission-Critical user plane Push To Talk voice |
| 67 | | 15 | 100 ms | $10^{-3}$ | N/A | 2000 ms | Mission Critical Video user plane |
| 75 | | 25 | 50 ms | $10^{-2}$ | N/A | 2000 ms | V2X messages |
| 5 | Non-GBR NOTE 1 | 10 | 100 ms | $10^{-6}$ | N/A | N/A | IMS Signalling |
| 6 | | 60 | 300 ms | $10^{-6}$ | N/A | N/A | Video (Buffered Streaming) TCP-based (e.g., www, e-mail, chat, ftp, p2p file sharing, progressive video, etc.) |
| 7 | | 70 | 100 ms | $10^{-3}$ | N/A | N/A | Voice, Video (Live Streaming) Interactive Gaming |
| 8 | | 80 | 300 ms | $10^{-6}$ | N/A | N/A | Video (Buffered Streaming) TCP-based (e.g., www, e-mail, chat, ftp, p2p file sharing, progressive video, etc.) |
| 9 | | 90 | | | | | |
| 69 | | 5 | 60 ms | $10^{-6}$ | N/A | N/A | Mission Critical delay sensitive signalling (e.g., MC-PTT signalling) |
| 70 | | 55 | 200 ms | $10^{-6}$ | N/A | N/A | Mission Critical Data (e.g. example services are the same as QCI 6/8/9) |
| 79 | | 65 | 50 ms | $10^{-2}$ | N/A | N/A | V2X messages |
| 80 | | 68 | 10 ms | $10^{-6}$ | N/A | N/A | Low Latency eMBB applications Augmented Reality |
| 81 | Delay Critical GBR | 11 | 5 ms | $10^{-5}$ | 160 B | 2000 ms | Remote control (see TS 22.261 [2]) |
| 82 | | 12 | 10 ms NOTE 5 | $10^{-5}$ | 320 B | 2000 ms | Intelligent transport systems |
| 83 | | 13 | 20 ms | $10^{-5}$ | 640 B | 2000 ms | Intelligent Transport Systems |
| 84 | | 19 | 10 ms | $10^{-4}$ | 255 B | 2000 ms | Discrete Automation |
| 85 | | 22 | 10 ms | $10^{-4}$ | 1358 B NOTE 3 | 2000 ms | Discrete Automation |

NOTE 1:
a packet which is delayed more than PDB is not counted as lost, thus not included in the PER.
NOTE 2:
it is required that default MDBV is supported by a PLMN supporting the related 5QIs.
NOTE 3:
This MDBV value is intended to avoid IP fragmentation on an IPv6 based, IPSec protected, GTP tunnel to the 5G-AN node.
NOTE 4:
A delay of 1 ms for the delay between a UPF terminating N6 and a 5G-AN should be subtracted from a given PDB to derive the packet delay budget that applies to the radio interface.
NOTE 5:
The jitter for this service is assumed to be 20 msec according to TS 22.261 [2].

In real-time deterministic communication, Time-Sensitive Networking (TSN) Task Group is a part of IEEE 802.1 WG focusing on Layer 2 aspects of deterministic networking. Deterministic Networking (DetNet) is an IETF WG focusing on Layer 3 aspects for enabling deterministic data paths, which provide bounds on latency, loss, and packet delay variation (jitter), and high reliability. Together, DetNet and TSN define a common architecture for deterministic networking in Layer 2 and Layer 3.

Before TSN, various fieldbus technologies have been applied in the field of automation and control. Fieldbus is the name of a family of industrial computer network protocols used for real-time distributed control, standardized as IEC 61158, which recognizes 16 Communication Profile Families (CPFs) such as the well-known PROFIBUS, EtherCAT, SERCOS, etc.

All these technologies aim to achieve real-time deterministic communications with diverse or similar approaches over mostly wired media. Among them, TSN over Ethernet receive most of the attention in 5G standardization. One of the key components of TSN is the 802.1Qbv standard "IEEE Std 802.1Qbv™-2015, Amendment 25: Enhancements for Scheduled Traffic, IEEE Computer Society" which defines a timed schedule of Gates—called Gate Control List (GCL) controlling the transmission through an output port of a compliant switch. There are up to 8 gates for as many Queues, supporting 8 traffic classes in 802.1Q, identified based on the Priority Code Point (PCP) value of the VLAN Header. The schedule repeats periodically and can be configured using a centralized network management entity or using a distributed protocol. The 802.1Qbv standard provides a network-wide static reservation of resources for scheduled traffic with known transmission times and payloads, based on the GCLs exchanged between the TSN switches.

Although being strongly demanded from vertical industries, 5G is not yet technically ready for supporting the integration into a larger real-time deterministic network such as TSN, neither from upper layer/architectural interfaces, nor from the lower layer features. For a delay critical GBR QoS flows, a packet delayed more than a Packet Delay Budget (PDB) is counted as lost if the transmitted data burst is less than Maximum Data Burst Volume within the period of PDB. But delay critical GBR is not equivalent to time-triggered communication. The key difference is that time-triggered communication involves static resource reservations for deterministic traffic patterns (ex. IEEE 802.1Qbv). As of today, there is no provision for time-triggered communication in 5G NR.

Figure 2:
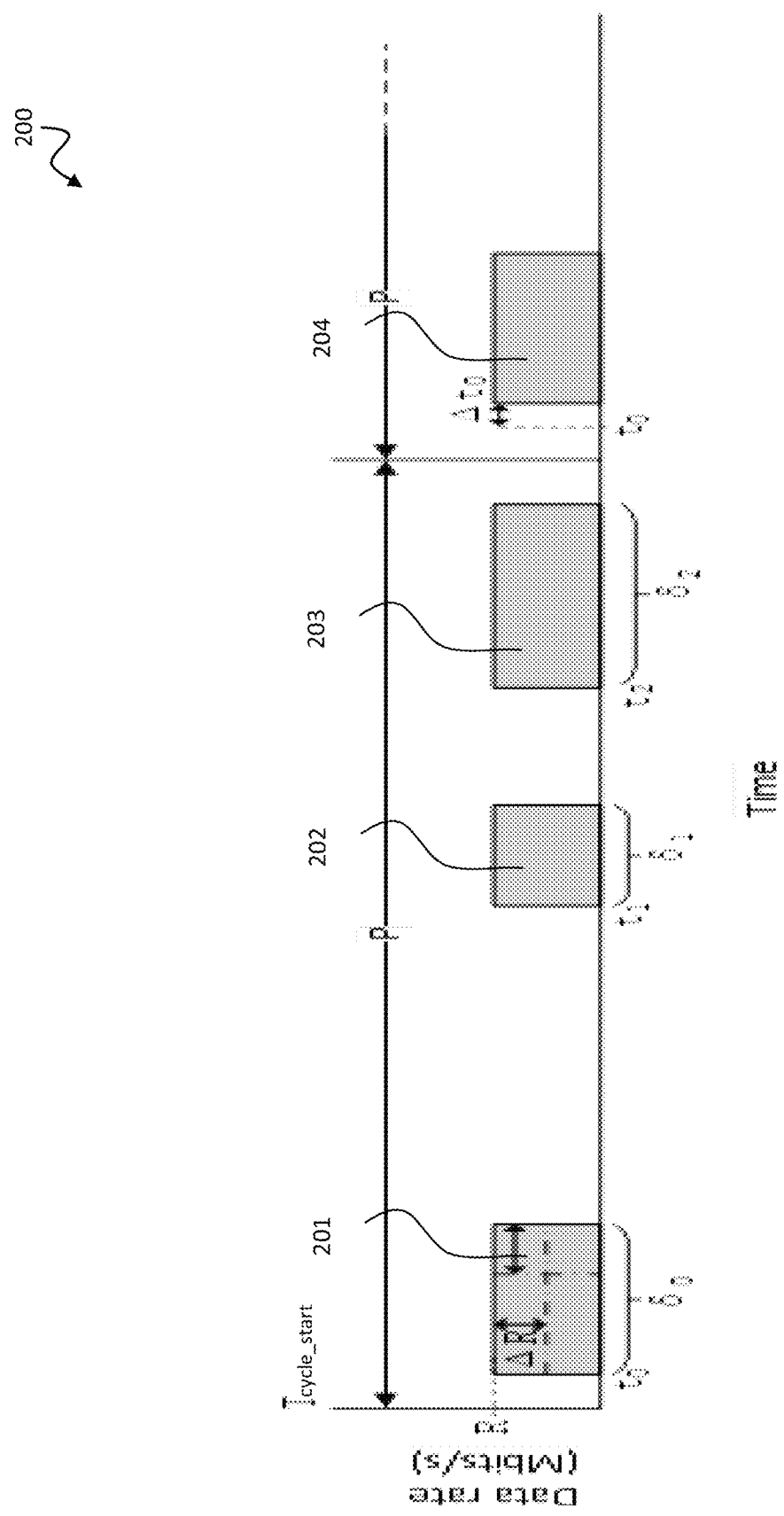
FIG. 2 shows an exemplary time diagram illustrating time-sensitive traffic characteristics.

FIG. 2 shows an exemplary time diagram 200 illustrating time-sensitive traffic characteristics. Time-critical traffic is usually deterministic in nature, i.e. the arrival time and volume of traffic is known in advance, to a high degree of precision. However, it may be possible that time-critical traffic is not deterministic, i.e. random or sporadic. In such cases, the transmission medium is usually able to accommodate the random variations of the traffic patterns up to a degree. Such cases are not considered in this disclosure. Time-critical traffic also typically has low latency requirements from source to destination ("end-to-end" latency). Furthermore, it generally has high reliability requirements, which implies a low packet loss/error rate. Time-critical traffic is often periodic with repeating traffic patterns (with the same aforementioned characteristics). In the example of FIG. 2, time-critical traffic consists of four data blocks 201, 202, 203, 204 having specific characteristics. The characteristics of time-sensitive traffic are depicted in FIG. 2 and defined in the following:

Max. Data rate R: Denotes the maximum data rate (ex. in bits/s) of the time-critical traffic. This sets a hard limit on the magnitude of the traffic bursts.

Data rate variation $\Delta R$: Variation in the actual data rate from the max. Data Rate. For a perfectly deterministic traffic pattern, this is zero.

Triggering/Starting Time(s) $t_0$, $t_1$, etc.: Starting time(s) of time-critical traffic on the link. Can be specified as a globally known time or as a relative offset to a globally known reference time.

Triggering/Starting Time variation $\Delta t_0$, $\Delta t_1$, etc.: Variation in the actual starting time of time-critical traffic on the link.

Traffic Duration(s) $\delta_0$, $\delta_1$, etc.: Duration of time-critical traffic burst.

Traffic Duration(s) variation $\Delta\delta_0$, $\Delta\delta_1$, etc.: Variation in the traffic durations of time-critical traffic. For a perfectly deterministic traffic pattern, this is zero.

Period of traffic pattern P: Periodicity of time-critical traffic pattern.

Cycle Start Time $T_{cycle\_start}$: Denotes the start time of the deterministic traffic burst.

In a deterministic network, these time-sensitive QoS characteristics are known in advance (prior to the cycle start time) in order for the network to take the appropriate steps to meet the associated QoS requirements. The traffic pattern may not be cyclic in which case the period P specifies the total duration of the traffic pattern and may be updated on-demand but always in advance to the starting time of the first burst in the new pattern.

As described above, the main concept of the disclosure is a QoS framework in mobile communication networks, in particular 5G, that supports time-triggered or deterministic traffic and includes the following components/aspects:

1) Time Sensitive Application Function (TS AF): Located in the 5G Core Network (5G CN), this AF interacts with the 5G CN to support the time-sensitive application, in particular, influences: 1) traffic treatment (via. SMF, UPF), 2) policy control (via. PCF) and 3) service exposure (via. NEF).

2) Time-Sensitive QoS Profile: A new QoS profile definition that includes time-sensitive parameters namely traffic triggering/starting time, traffic duration and volume, as well as mapping existing 5G QoS profile parameters to additional time-sensitive QoS parameters.

3) Procedures to enable end-to-end communication for time sensitive traffic: Signaling procedures between the 5G CN and TS-AF, as well as 5G (R)AN and 5G CN to support end-to-end time-sensitive traffic flows in the 5G system.

In order to manage the time-critical traffic flows in the 5G system, the QoS characteristics and the QoS requirements of the incoming traffic should first be understood. The TS AF receives this information from the external data network (the Time-Sensitive application in this case) and translates this to a new time-sensitive 5G QoS profile that can be applied in the 5G network. This is the first function of the TS AF.

A second function of the TS AF is to negotiate the generated TS QoS profile with the 5G CN, specifically the PCF in order to ensure that the 5G system can satisfy the TS QoS requirements.

A third function of the TS AF is to update the internally (within 5GS) agreed TS QoS to the external TS network. This uses appropriate translation of the agreed TS QoS parameters for the external network.

As mentioned above, the 5G QoS Profile does not specify time-triggered traffic characteristics or requirements. The concept according to the disclosure adds time-triggered or deterministic traffic characteristics to the 5G QoS model.

Figure 3:
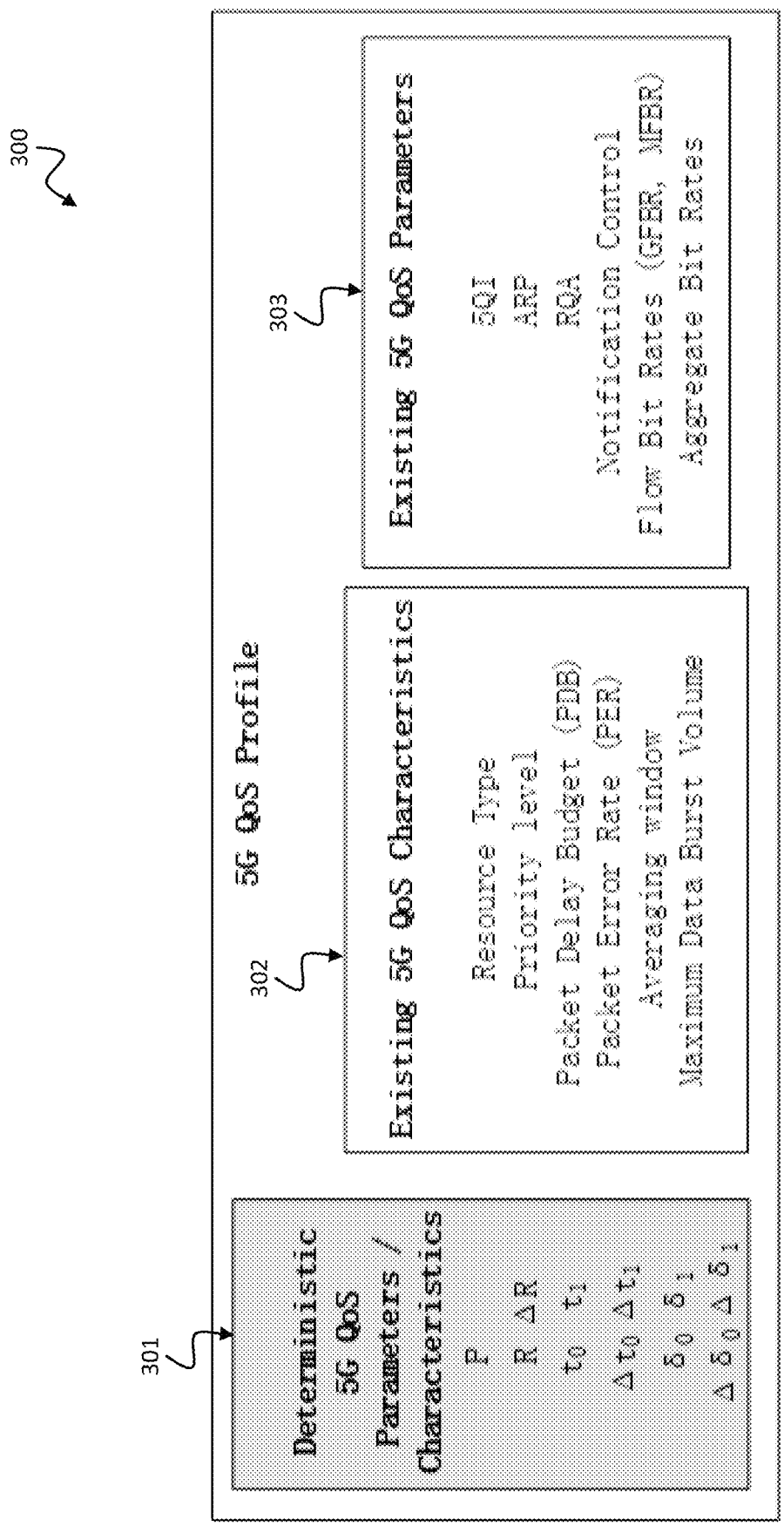
FIG. 3 shows a schematic diagram illustrating an exemplary 5G QoS profile with deterministic QoS parameters/characteristics according to the disclosure.

FIG. 3 shows the time-sensitive QoS Profile 300 with additional TS QoS characteristics 301 that captures the TS QoS Characteristics defined earlier as well as the TS QoS requirements of such traffic flows. This TS QoS profile 300, once accepted by the 5G CN and used to set up a PDU session, will ensure that the 5G System fulfils the QoS requirements of the TS application.

The TS QoS profile 300, once accepted within the 5G system at the PDU Session or QoS Flow level, guarantees that the TS QoS Requirements are met for that QoS Flow. This guarantee is made possible by aligning the 5G (R)AN and 5GC elements 302, 303 to take the necessary steps to ensure that the TS QoS Profile 300 is accepted only after appropriate steps to guarantee its enforcement are taken.

In the following figures, procedures to enable end-to-end communication for time sensitive traffic are described. The following procedures involving the TS AF, 5GC and 5G (R)AN are introduced to ensure 5G support for time-sensitive traffic. New signaling procedures or existing signaling with new parameters are underlined. If no signaling in a figure is underlined, it means the entire procedure is new. Optional procedures are enclosed in curly braces { }.

Figure 4:
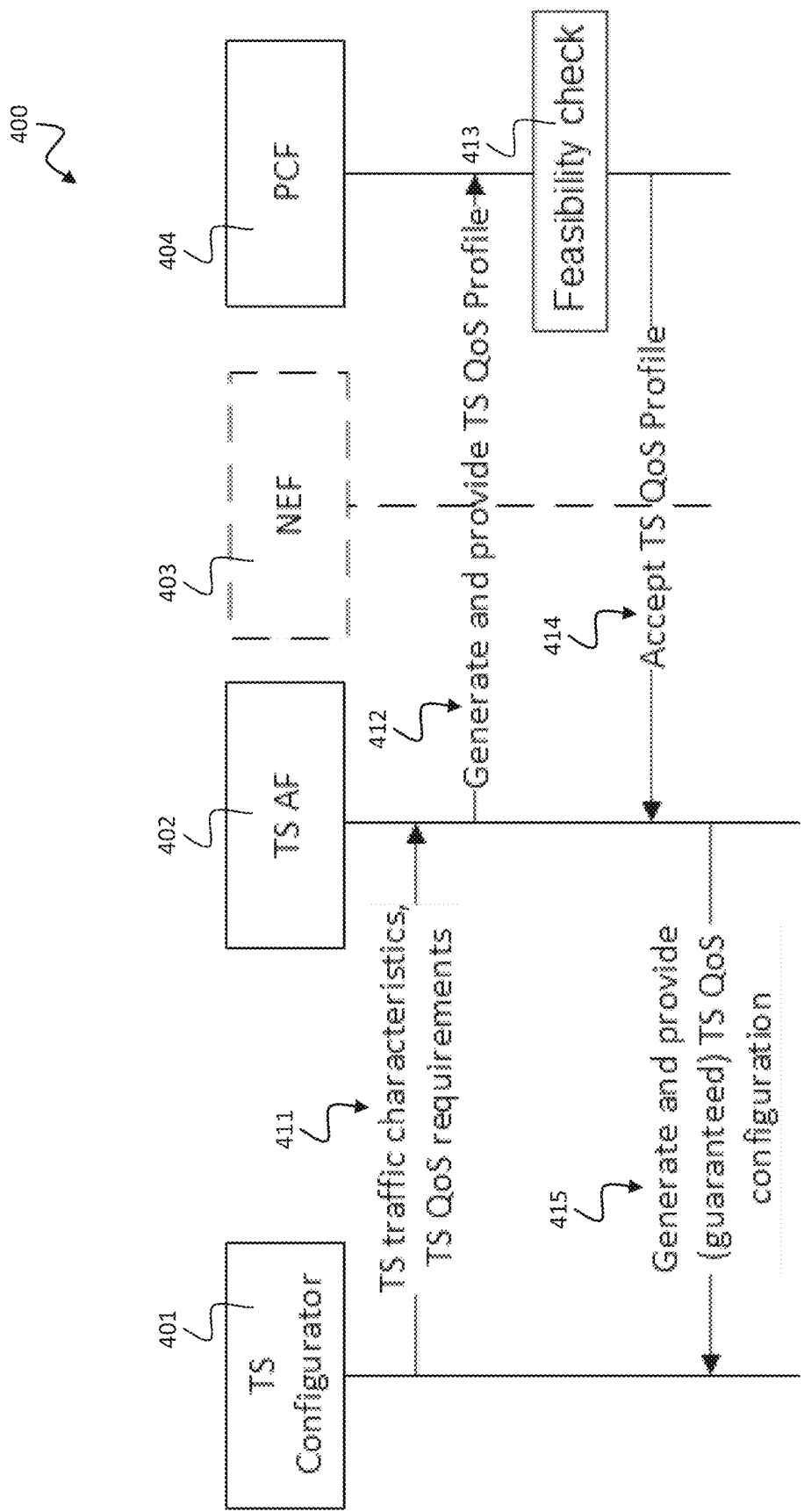
FIG. 4 shows an exemplary message chart illustrating acceptance of TS 5G QoS profile from external TS configuration according to the disclosure.

FIG. 4 shows an exemplary message chart 400 illustrating acceptance of TS 5G QoS profile from external TS configuration according to the disclosure.

FIG. 4 describes the message sequence for generation of a TS 5G QoS Profile by interworking of the blocks TS (time-sensitive) Configurator 401, TS AF (application function) 402, NEF (network exposure function) 403 and PCF (policy control function) 404. TS Configurator 401 transmits a message 411 including TS traffic characteristics and/or TS QoS requirements to TS AF 402 which generates and provides TS QoS profile 412 to PCF 404. PCF 404 performs a feasibility check 413 to check if PCF is able to process this TS QoS profile. If yes, PCF informs 414 TS AF 402 about acceptance of this TS QoS profile. Then TS AF 402 generates and provides (guaranteed) TS QoS configuration 415 to TS configurator 401. The messages generating and providing TS QoS profile 412 and accept TS QoS profile 414 may be transmitted via the NEF 403.

The TS Configurator 401 belongs to the external time-sensitive network to which the TS AF 402 provides an interface. Depending on whether TS AF 402 is a trusted function or not, signaling between TS AF 402 and PCF 404 can be bridged by NEF 403. The PCF 404 performs a feasibility check 413 to ensure that the received TS QoS Profile 412 can be guaranteed by the 5G System as a whole (CN and RAN) and also aligned with the UE subscription. This requires further negotiation procedures with other 5GC NFs and the 5G (R)AN which are described further below.

Figure 5:
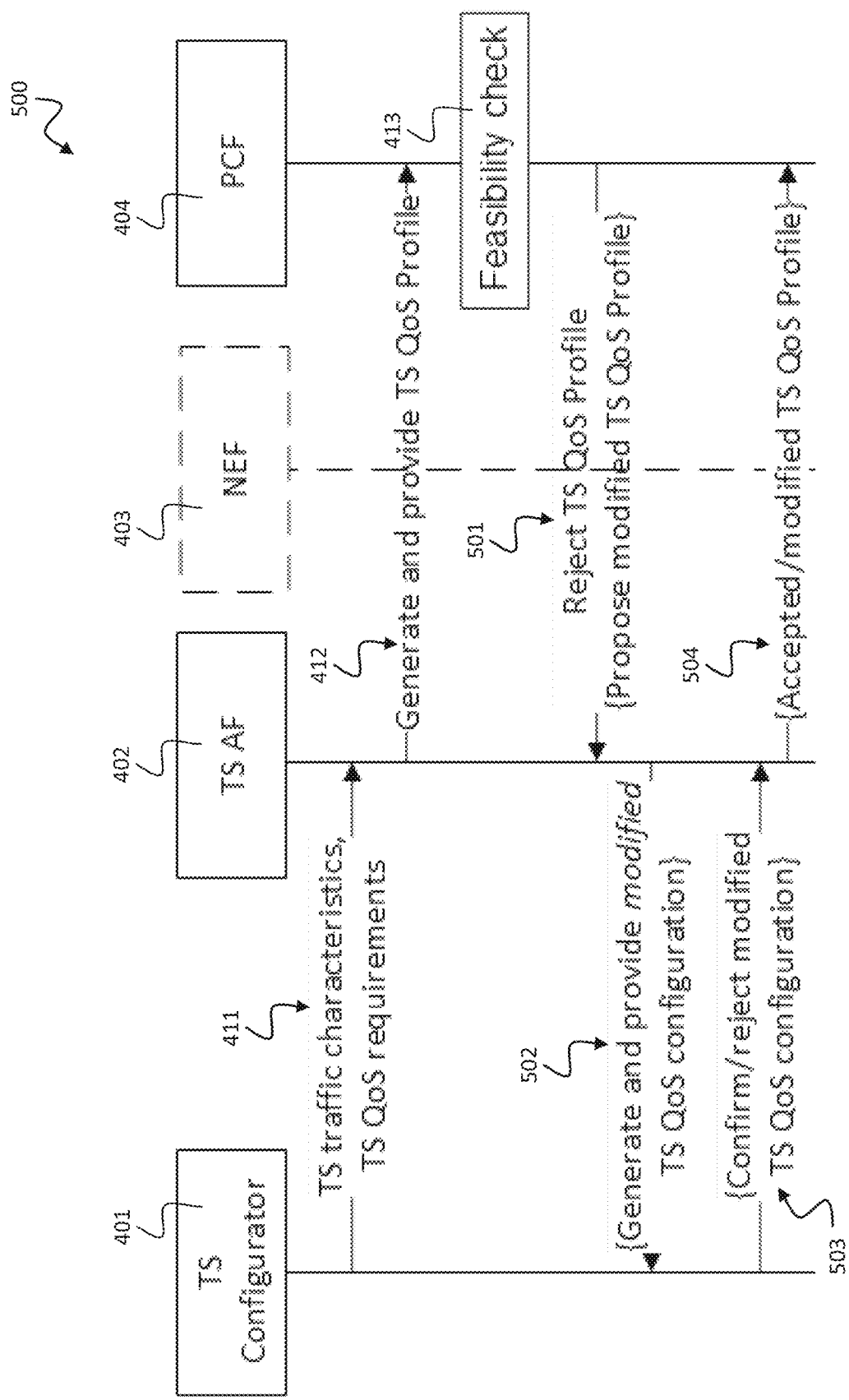
FIG. 5 shows an exemplary message chart illustrating negotiation of TS QoS profile between TSN-AF, PCF and TS configurator according to the disclosure.

FIG. 5 shows an exemplary message chart 500 illustrating negotiation of TS QoS profile between TSN-AF, PCF and TS configurator according to the disclosure.

FIG. 5 describes the message sequence for TS 5G QoS Profile negotiation by the same blocks as described above with respect to FIG. 4, i.e. TS Configurator 401, TS AF 402, NEF 403 and PCF 404. TS Configurator 401 transmits a message 411 including TS traffic characteristics and/or TS QoS requirements to TS AF 402 which generates and provides TS QoS profile 412 to PCF 404. PCF 404 performs a feasibility check 413 to check if PCF is able to process this TS QoS profile. If no, PCF informs 501 TS AF 402 about rejection of this TS QoS profile and proposes a modified TS QoS profile. Then TS AF 402 generates and provides modified TS QoS configuration 502 to TS configurator 401. TS configurator 401 confirms or rejects 503 modified TS QoS configuration by sending a corresponding message to TS AF 402 which transmits accepted/modified TS QoS profile 504 to PCF 404. The messages 412, 501 and 504 may be transmitted via the NEF 403.

If the PCF 404 cannot guarantee to meet the TS QoS requirements (e.g. due to RAN over-provisioning), it rejects 501 the TS QoS Profile and optionally proposes a modified TS QoS Profile that it can satisfy. This is followed by a confirmation 504 by the TS AF 402 whether the modified TS QoS Profile should be applied.

Figure 6:
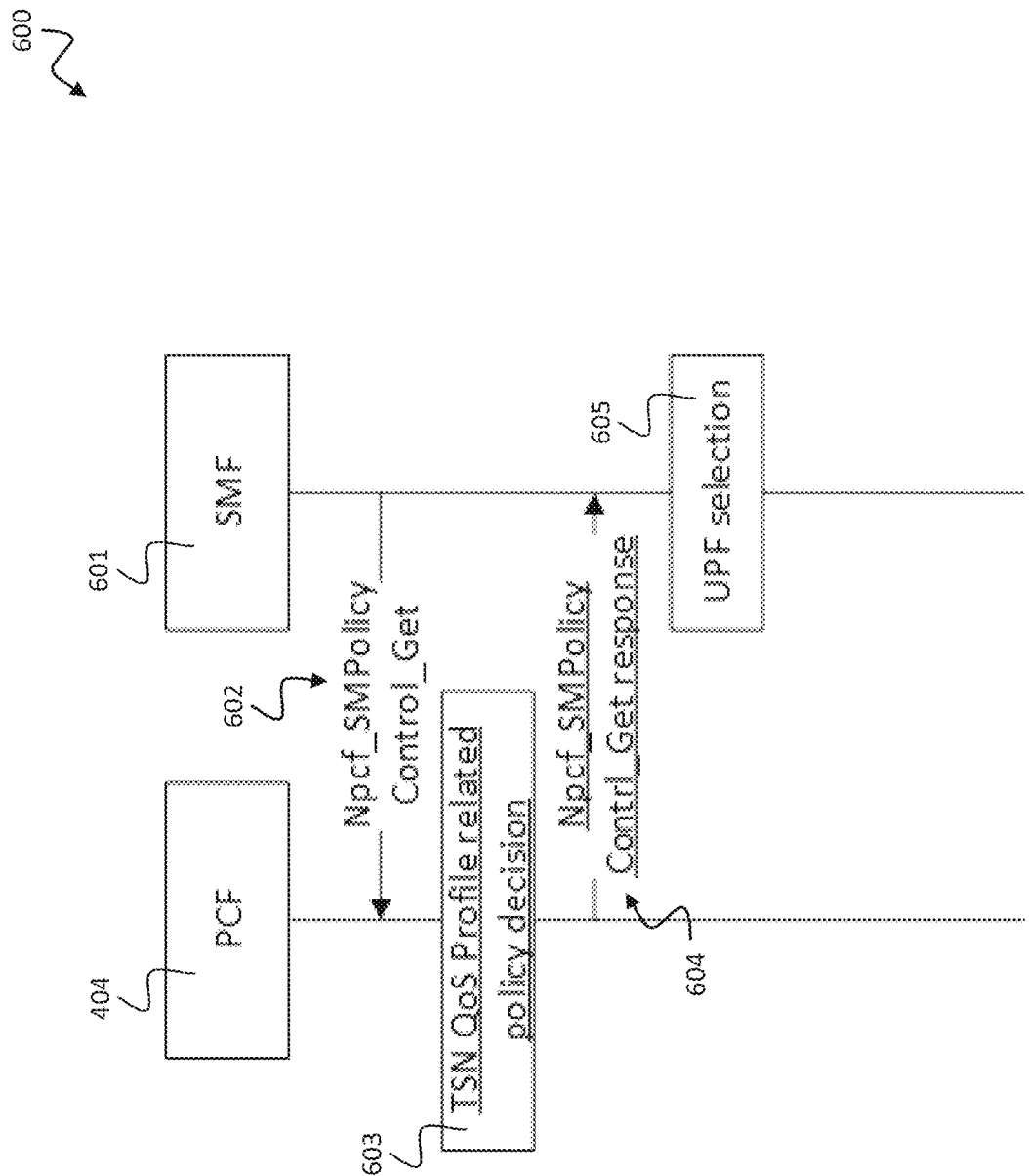
FIG. 6 shows an exemplary message chart illustrating PCF-SMF interaction for UPF selection (Pull) according to the disclosure.
Figure 7:
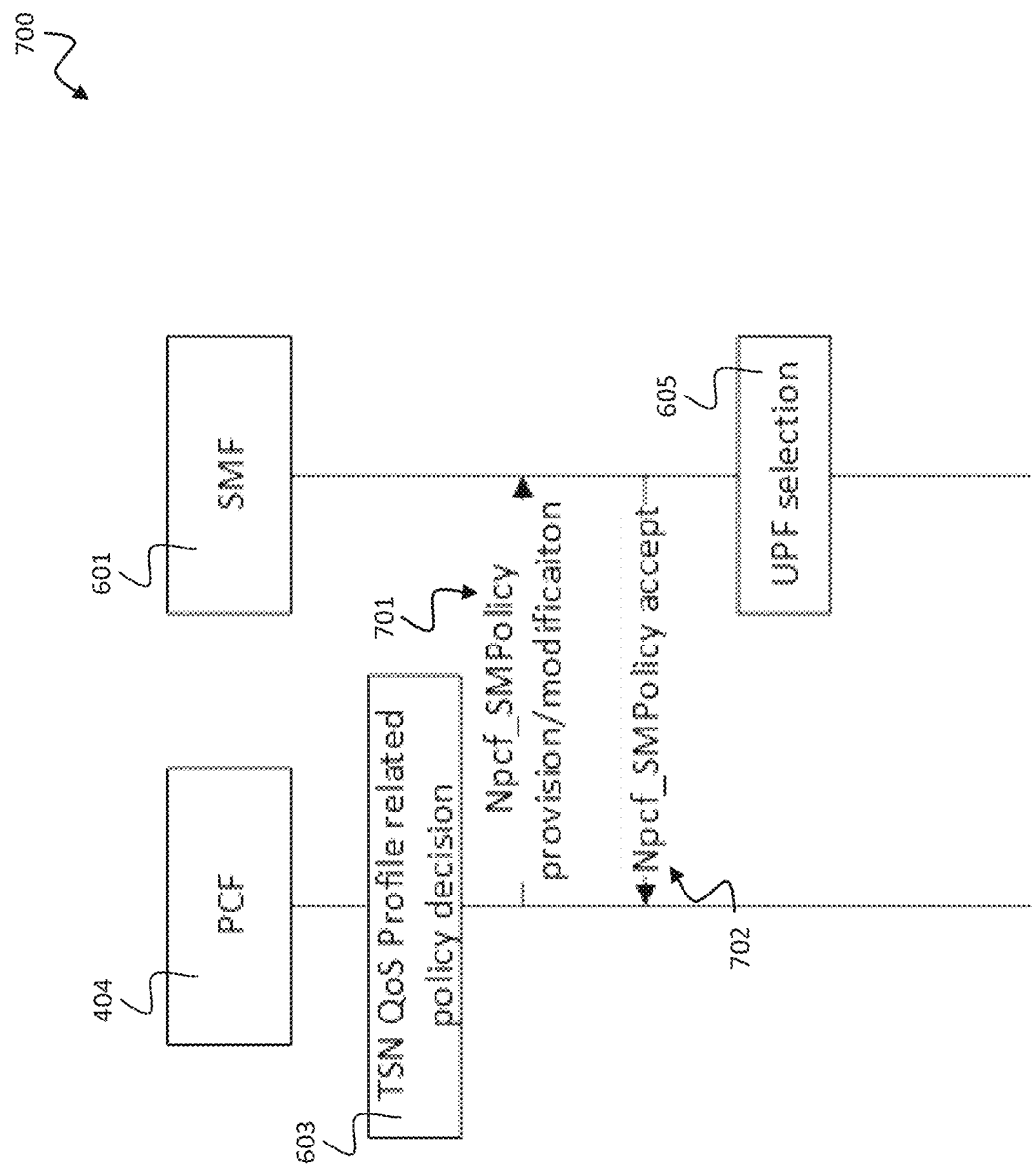
FIG. 7 shows an exemplary message chart illustrating PCF-SMF interaction for UPF selection (Push) according to the disclosure.

FIG. 6 shows an exemplary message chart 600 illustrating PCF-SMF interaction for UPF selection for the Pull configuration according to the disclosure. FIG. 7 shows an exemplary message chart 700 illustrating PCF-SMF interaction for UPF selection for the Push configuration according to the disclosure.

FIGS. 6 and 7 describes the message sequence for updating the TS QoS profile configuration to SMF for influencing UPF selection by using the blocks PCF 404 and SMF 601. The PCF 404 influences the UPF selection by signaling to the SMF 601 the selected TS QoS Profile related policy decision 603. Such information can be either pushed (FIG. 7) to SMF 601 by the QoS rule provision/modification 701 or SMF 601 pulls 602 the related policy from the PCF 404 as shown in the example signaling sequence chart in FIG. 6. What is carried in the related signaling can be either TSN QoS profile or QoS profile related policy. SMF 601 passes the TS QoS profile related QoS rules to RAN and UE, e.g. by using the session establishment procedure as defined in 3GPP TS 23.502. SMF 601 may only pass some of the QoS Profile to the RAN and UE or a different format that is mapped to the original TS QoS Profile.

Figure 8:
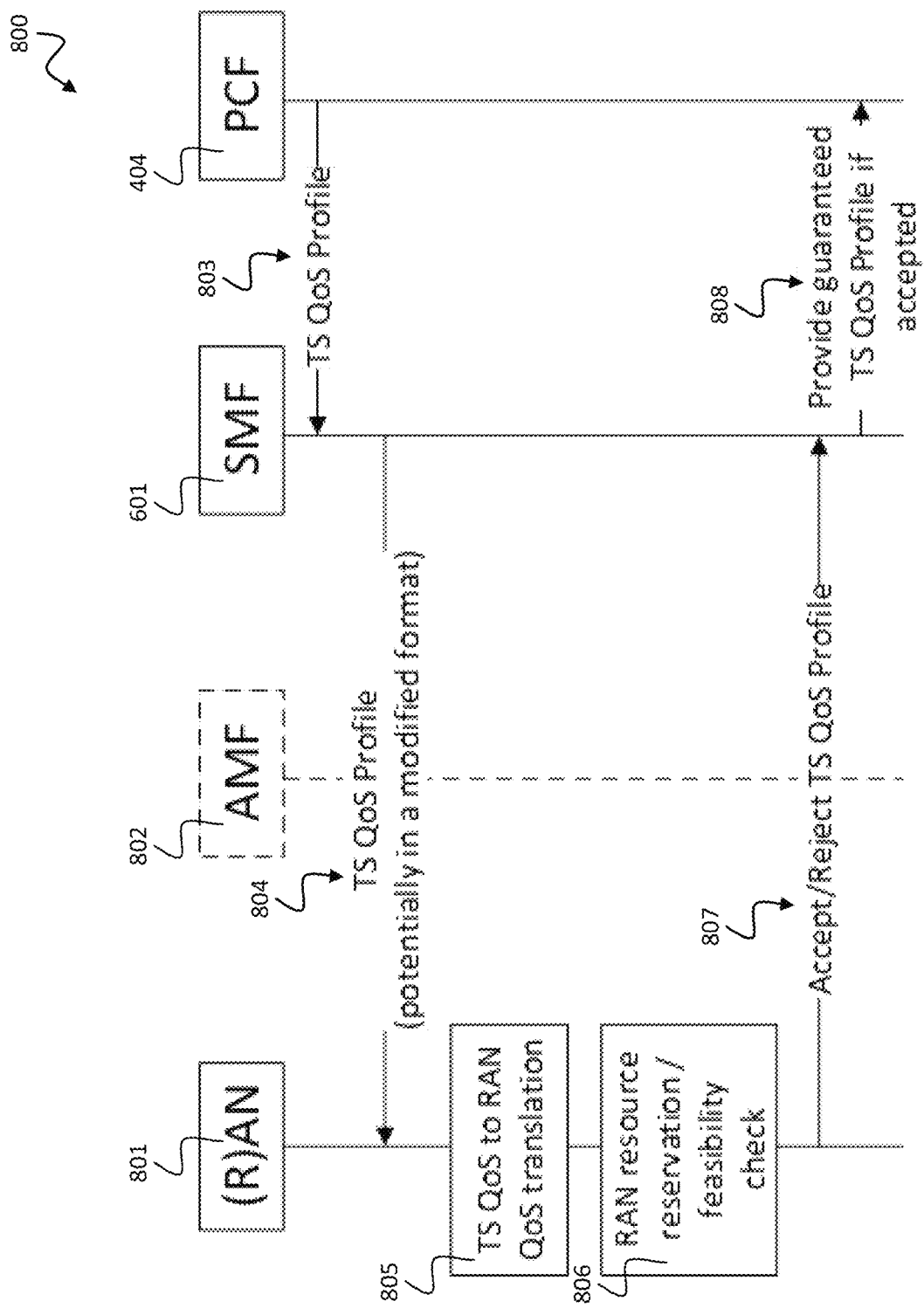
FIG. 8 shows an exemplary message chart illustrating SMF interaction with RAN for resource reservation for TS traffic according to the disclosure.

FIG. 8 shows an exemplary message chart 800 illustrating SMF interaction with RAN for resource reservation for TS traffic according to the disclosure. FIG. 8 describes the message sequence for SMF interaction with RAN to ensure TS QoS Profile enforcement guarantee. The blocks PCF 404, SMF 601, (R)AN 801 and optionally AMF 802 are used. SMF 601 sends the QoS Profile 804 to RAN 801 and RAN 801 sends the QoS Profile to UE (not shown in FIG. 8).

The SMF 601 informs 804 the RAN 801 about the desired TS QoS Profile 803 (received from the PCF 404) and related QoS policy rules. The TS QoS requirements need to be translated to RAN QoS requirements 805 which may be done at the RAN 801. The RAN 801 does a feasibility check 806 including potentially reserving RAN resources according the RAN QoS requirements. Once the RAN 801 confirms a particular TS QoS Profile, this is signaled 807, 808 to the TS AF via the PCF 404.

Figure 9:
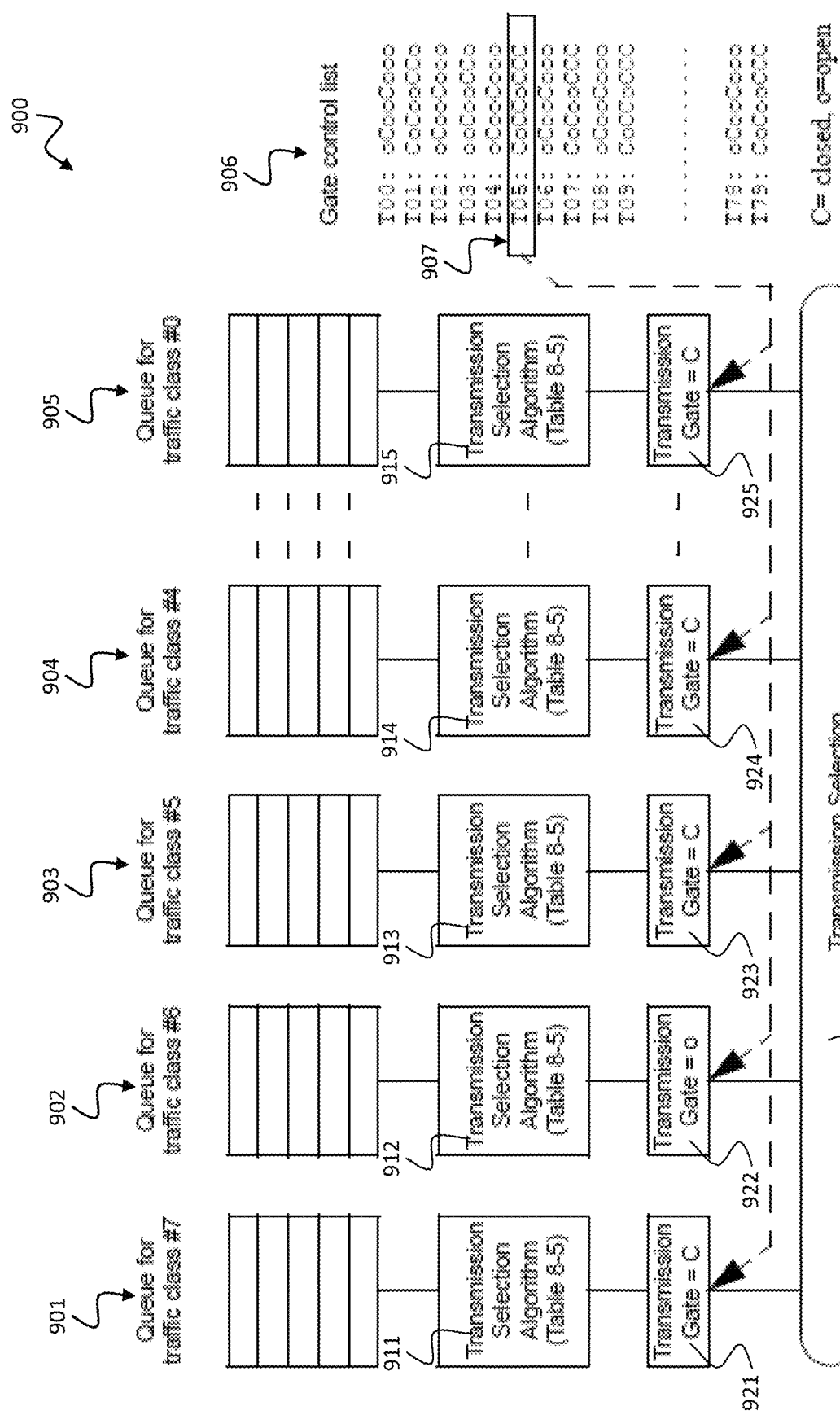
FIG. 9 shows a schematic diagram illustrating transmission selection with gate control lists according to 802.1Qbv specification.

FIG. 9 shows a schematic diagram illustrating transmission selection or switching 900 with gate control lists according to 802.1Qbv specification, also referred to as TSN 802.1Qbv or Time Aware Shaper (TAS). According to the disclosed concept, support for the TSN 802.1Qbv standard in 5G in provided, specifically to make the 5G system compatible with TSN 802.1Qbv. FIG. 9 shows an example for this support in order to provide a comprehensive analysis of the three main aspects of the disclosure described above, which are:

1) Time Sensitive Application Function (TS AF): Located in the 5G Core Network (5G CN), this AF interacts with the 5G CN to support the time-sensitive application, in particular, influences 1) traffic treatment (via. SMF, UPF), 2) policy control (via. PCF) and 3) service exposure (via. NEF).

2) Time-Sensitive QoS Profile: A new QoS profile definition that includes time-sensitive parameters namely traffic triggering/starting time, traffic duration and volume, as well as mapping existing 5G QoS profile parameters to additional time-sensitive QoS parameters.

3) Procedures to enable end-to-end communication for time sensitive traffic: Signaling procedures between the 5G CN and TS-AF, as well as 5G (R)AN and 5G CN to support end-to-end time-sensitive traffic flows in the 5G system.

802.1Qbv defines a cyclic timed schedule of Gates—called Gate Control List (GCL) 906, which control the transmission through an output port of a compliant switch 900 as depicted in FIG. 9. There are up to 8 gates 921, 922, 923, 924, 925 for as many Queues 901, 902, 903, 904, 905 and corresponding transmission selection algorithms 911, 912, 913, 914, 915, supporting 8 traffic classes in 802.1Q, identified based on the Priority Code Point (PCP) value of the VLAN Header. The schedule repeats periodically and can be configured using a centralized network management entity, e.g. the TS Configurator 401 shown in FIG. 4, or using a distributed protocol. FIG. 9 depicts eight queues 901, 902, 903, 904, 905 of a TSN-compatible switch 900 whose transmission schedule (i.e. Open: 'o' or Closed: 'C') is controlled by a time-indexed Gate control list 906. For example in FIG. 9, transmission gate 922 of queue 902 is open while transmission gates 921, 923, 924, 925 are closed according to time index T05 of gate control list 906. The time indices T00, T01, etc. correspond to time intervals that are globally recognized in the TSN network. Specific queues may be reserved for time-sensitive traffic (called Scheduled traffic in 802.1Qbv parlance) and some queues may be shared by time-sensitive and best-effort traffic, however separated in time. Data from open transmission gates is selected for transmission 930.

Figure 10:
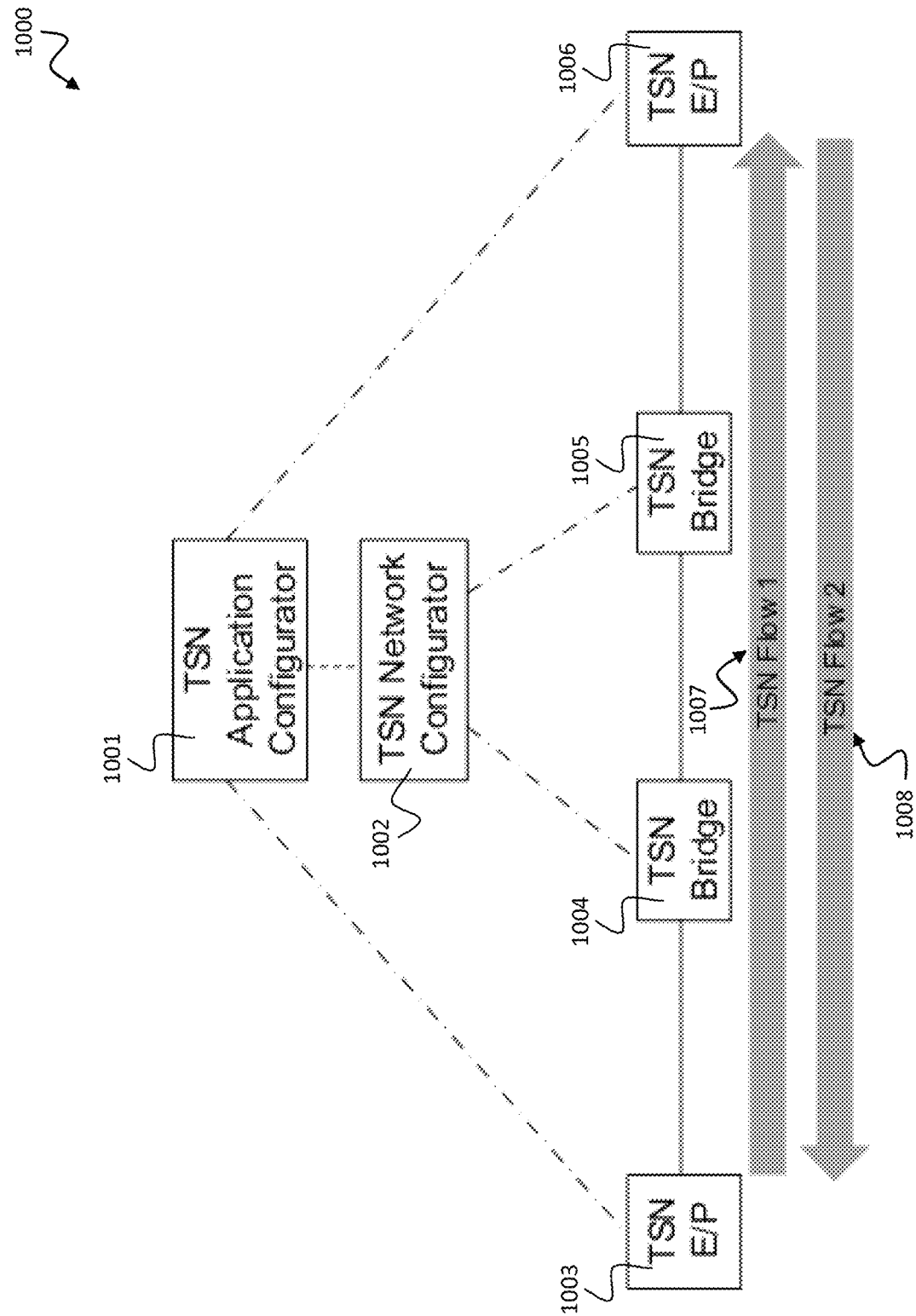
FIG. 10 shows an architecture diagram illustrating an exemplary TSN topology.

FIG. 10 shows an architecture diagram illustrating an exemplary TSN topology 1000. The 802.1Qbv standard provides a network-wide static reservation of resources for scheduled traffic with known transmission times and payloads, based on the GCLs exchanged between the TSN switches.

As shown in FIG. 10, two TSN Endpoints ('TSN E/P') 1003, 1006 are connected to each other over three hops and two TSN Bridges 1004, 1005. Two TSN flows 1007, 1008 are established in each direction and uniquely identified in the network. The Endpoints 1003, 1006 communicate their application requirements on a per-flow basis to the TSN Application Configurator 1001, which communicates this information to the TSN Network configurator 1002. The TSN Network Configurator 1002 configures the TSN Bridges 1004, 1005 according to the per-flow requirements received from the TSN application configurator 1001.

FIG. 11 shows a table 1100 illustrating an exemplary 5G TSN QoS profile for a single 802.1Qbv TSN flow, e.g. one of the flows 1007, 1008 depicted in FIG. 10, according to the disclosure. The TSN QoS Profile is one example of a deterministic QoS profile.

The TSN QoS profile adds new TSN-specific QoS characteristics to the 5G QoS Profile as shown in FIG. 11. This TSN QoS profile is used to set up an E2E PDU Session or QoS Flow within the 5G network and may correspond to one or more TSN Flows 1007, 1008 described above with respect to FIG. 10. The TSN QoS Profile applies to the end-to-end 5G link and may comprise multiple hops in the 5G network. Individual hops within the 5G network have their respective RAN-QoS aligned with this E2E QoS.

The table 1100 in FIG. 11 shows one embodiment of the 5G QoS Profile adapted for TSN traffic for a specific TSN flow. The entries in the table may be dynamically created/updated/signaled based on received TSN configuration. Each row corresponds to one burst of 802.1Qbv scheduled data within the TSN flow. The shaded columns represent new parameters or parameter values. For example, SQI value 1101 indicates a TSN-specific range; resource type 1102 indicates a new resource type, that is, time-triggered; starting time 1103 indicates absolute time stamp (obtained from TSN) for start of TSN data flow; period 1104 indicates period of the flow; data volume 1105 indicates data volume or data rate of the data flow, e.g. in kilo bytes; priority level 1106 indicates priority, for example PCP field in 802.1Q frame; packet delay budget 1107 indicates a delay as obtained from TSN configuration; and packet error rate 1108 indicates an error rate as obtained from TSN configuration, e.g. from TSN application Configurator 1001 or TSN network Configurator as shown in FIG. 10.

Another embodiment is to carry deterministic QoS characteristics in additional signaling and use it together with the current SQIs.

In an alternative embodiment, the newly presented deterministic QoS parameters may be specified as QoS characteristics corresponding to a new Resource Type 1102 (for example: 'Deterministic' or 'Time-triggered').

Figure 12:
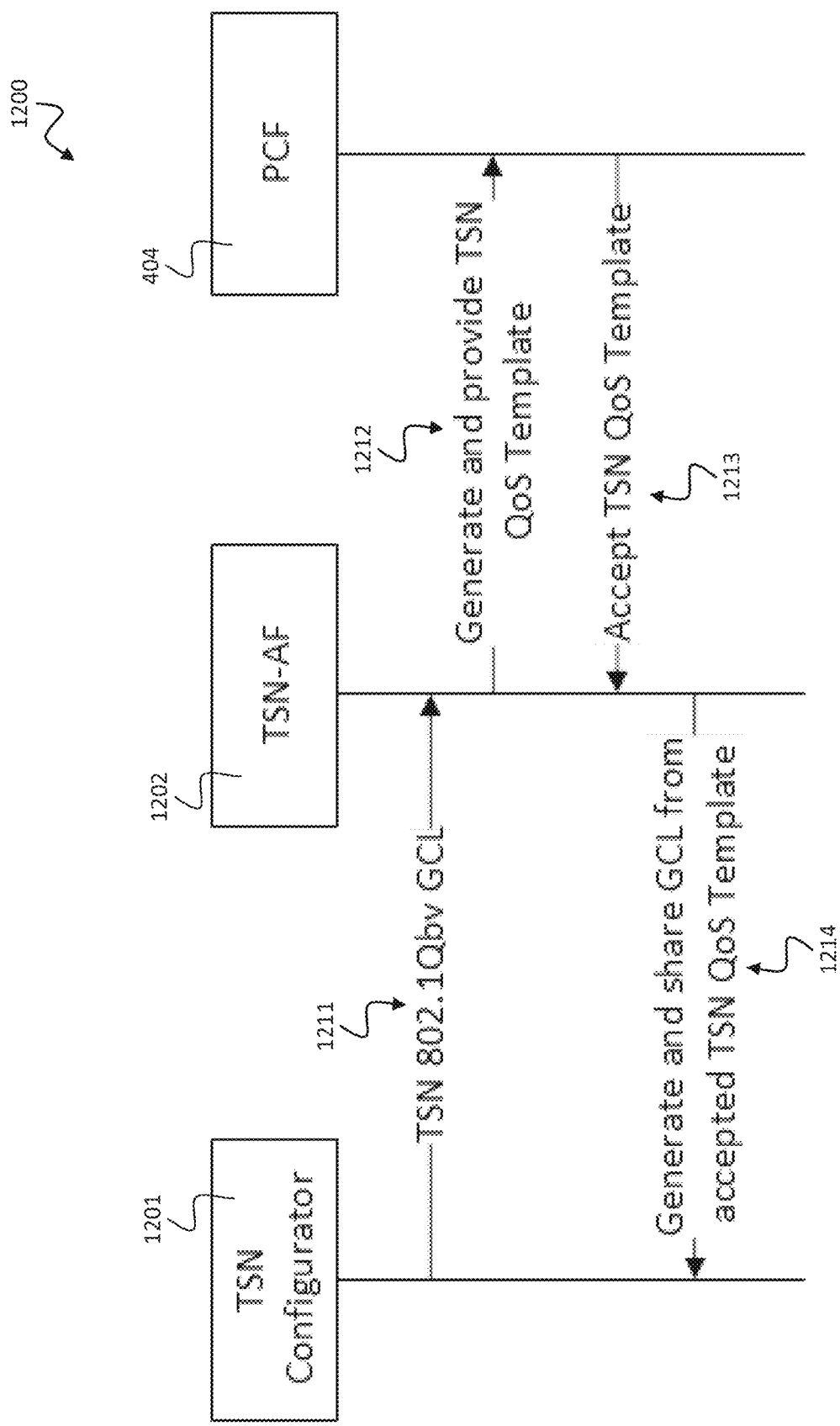
FIG. 12 shows an exemplary message chart illustrating generation of TSN 5G QoS profile from 802.1Qbc gate control lists according to the disclosure.

FIG. 12 shows an exemplary message chart 1200 illustrating generation of TSN 5G QoS profile from 802.1Qbc gate control lists according to the disclosure.

FIG. 12 describes the message sequence for generation of TSN QoS Profile by interworking of the blocks TSN (time-sensitive networking) Configurator 1201, TSN AF 1202 and PCF 404. TSN Configurator 1201 transmits a message 1211 including TSN 802.1Qbv GCL (gate control list), e.g. GCL 906 as described above with respect to FIG. 9, to TSN AF 1202 which generates and provides TSN QoS template 1212 to PCF 404. If PCF 404 can accept this TSN QoS template, PCF 404 informs TSN AF 1202 about TSN QoS template acceptance 1213. Then TSN AF 1202 generates and shares GCL from accepted TSN QoS template 1214 with TSN configurator 1201. The messages between TSN-AF 1202 and PCF 404 may be transmitted via a NEF 403, e.g. as shown in FIG. 4.

Figure 13:
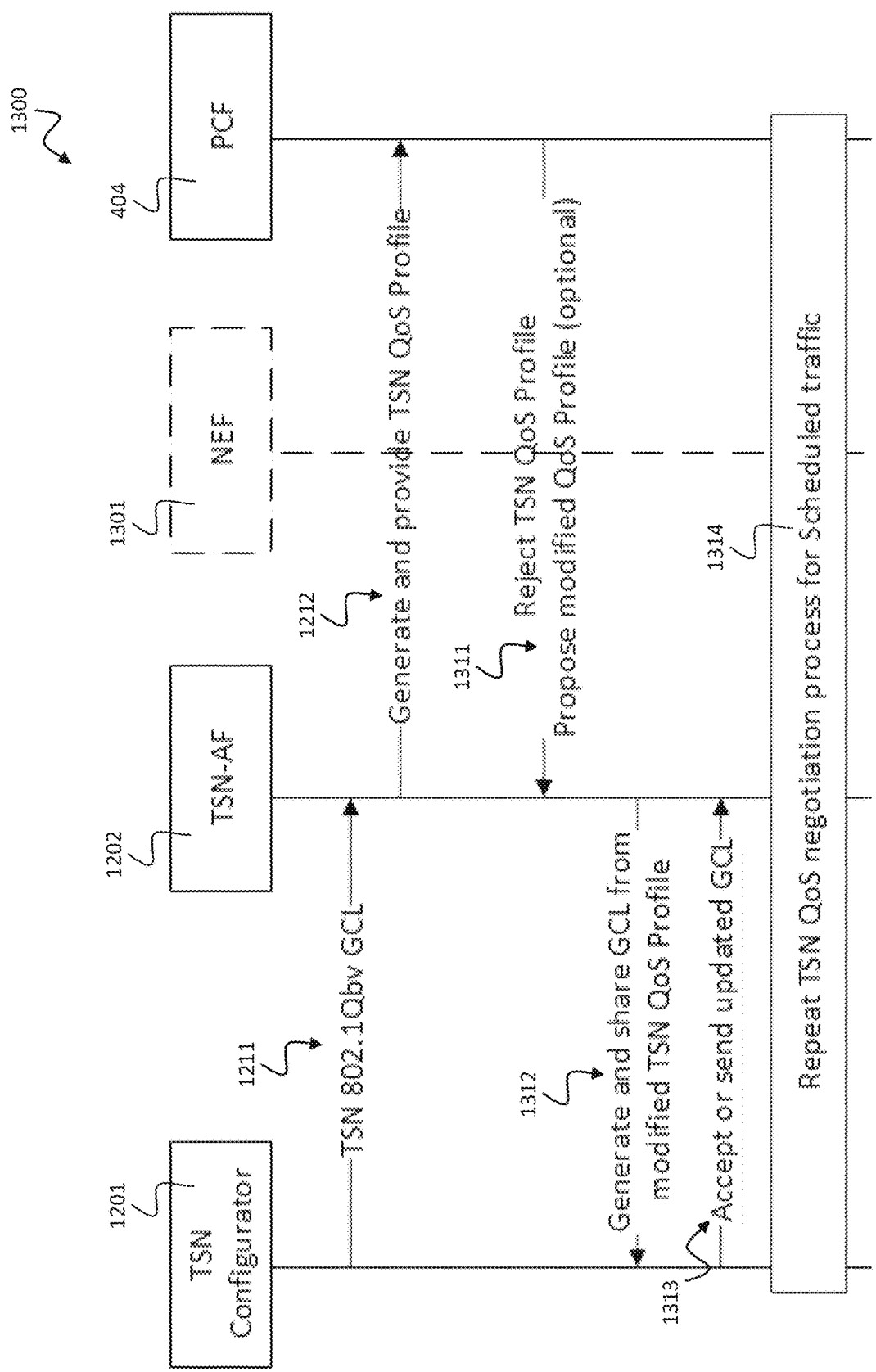
FIG. 13 shows an exemplary message chart illustrating negotiation of TSN QoS profile between 5G and TSN configurator according to the disclosure.

FIG. 13 shows an exemplary message chart 1300 illustrating negotiation of TSN QoS profile between 5G and TSN configurator according to the disclosure.

FIG. 13 describes the message sequence for TSN QoS Profile negotiation by the same blocks as described above with respect to FIG. 4, i.e. TSN Configurator 1201, TSN AF 1202, optionally NEF 1301, and PCF 404. TS ConfiguratorN 1201 transmits TSN 802.1Qbv GCL 1211 to TS AF 1202, which generates and provides TSN QoS profile 1212 to PCF 404 as described above with respect to FIG. 12. PCF 404 checks if PCF is able to process this TSN QoS profile. If no, PCF 404 informs 1311 TSN AF 1202 about rejection of this TSN QoS profile and optionally proposes a modified TSN QoS profile. Then, TSN AF 1202 generates and shares GCL from modified TSN QoS profile 1312 with TSN configurator 1201. TSN configurator 1201 accepts this modified TSN QoS profile or sends updated GCL 1313 to TSN AF 1202. TSN QoS negotiation may be repeated 1314 for scheduled traffic. The messages between TSN-AF 1202 and PCF 404 may be transmitted via a NEF 1301, e.g. NEF 403 as shown in FIG. 4.

The TSN QoS Profile can be implemented as the 5QI specified for 'Deterministic' resource type, or the current standardized 5QI+additional deterministic QoS characteristics (alternative embodiments).

The example procedure for the TSN-AF 1202 request to influence QoS policy follows the principles specified in TS 29.514 5G system Policy Authorization Service session 4.2. The AF shall invoke (either directly of via the NEF 1301) the Npcf_PolicyAuthorization_Create/Update Request service operation.

The service information included in Npcf_PolicyAuthorization_Create/Update Request service operation can be extended by:
Indication of the usage of TSN QoS profile type
Preferred/Acceptable values of additional TS QoS characteristics
Indication of whether negotiation is allowed or not (optional)

The feedback of Npcf_PolicyAuthorization_Create/Update Request can be either accepted or temporarily rejected as specified in TS23.203 session 6.2.1. The rejection can optionally carry the information on the modified QoS profile (with proposed value from the PCF 404).

After the negotiation and coordination with TSN configurator 1201, TSN-AF 1202 generates and provides TSN QoS profile 1212 using the proposed value from the PCF 404 or a different value to the one provided in the previous round to the PCF 404.

Figure 14:
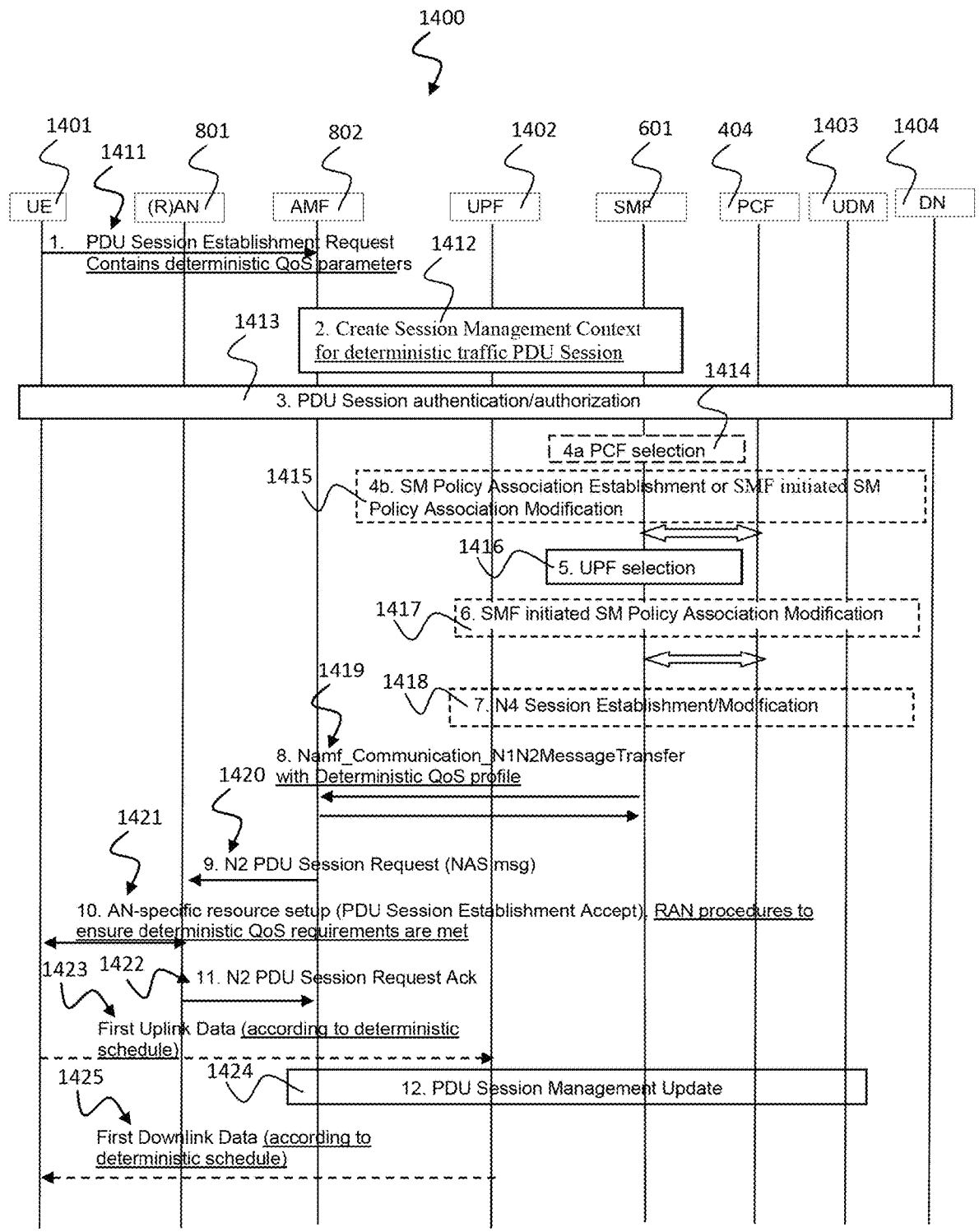
FIG. 14 shows an exemplary message chart illustrating PDU session establishment for 802.1Qbv traffic according to the disclosure.

FIG. 14 shows an exemplary message chart 1400 illustrating PDU session establishment for 802.1Qbv traffic according to the disclosure.

The signaling procedure for setting up a PDU session with deterministic QoS is shown in FIG. 14. A similar procedure applies for modifying an existing PDU session with (new) deterministic QoS Profile/parameters. The following network nodes are used for the messaging: UE 1401, RAN 801, e.g. as described with respect to FIG. 8, AMF 802, e.g. as described with respect to FIG. 8, UPF 1402, SMF 601, e.g. as described with respect to FIG. 6, PCF 404, e.g. as described with respect to FIG. 4, UDM 1403 and DN 1404.

The message chart 1400 includes the following messages: In step 1, a PDU session establishment request that contains deterministic parameters 1411 is transmitted from UE 1401 to AMF 801. In step 2, Session management context is created for deterministic traffic PDU session 1412. In step 3, PDU session authentication/authorization 1413 is performed. In step 4a SMF 601 performs PCF selection 1414 and in step 4b SMF 601 performs SM policy association establishment or SMF initiated SM policy association modification is performed. In step 5, SMF 601 performs UPF selection. In step 6, SMF 601 performs SMF initiated SM policy association modification 1417. In step 7, SMF 601 performs N4 session establishment/modification 1418. In step 8, SMF 601 transmits Namf_Communication_N1N2MessageTransfer with deterministic QoS profile 1419 to AMF 802 which confirms this message. In step 9, AMF 802 transmits N2 PDU session request (NAS msg) to RAN 801. In step 10, RAN 801 and UE 1401 negotiate about AN-specific resource setup (PDU Session Establishment Accept), RAN procedures to ensure deterministic QoS requirements are met. In step 11, RAN 801 transmits N2 PDU session request Ack 1422 to AMF 802. Then, first uplink data (according to deterministic schedule) is transmitted by UE 1401 via RAN 801, AMF 802 to UPF 1402. In step 12, PDU session management update is performed. Then, first downlink data (according to deterministic schedule) is transmitted by UPF 1402 to UE 1401.

Figure 15:
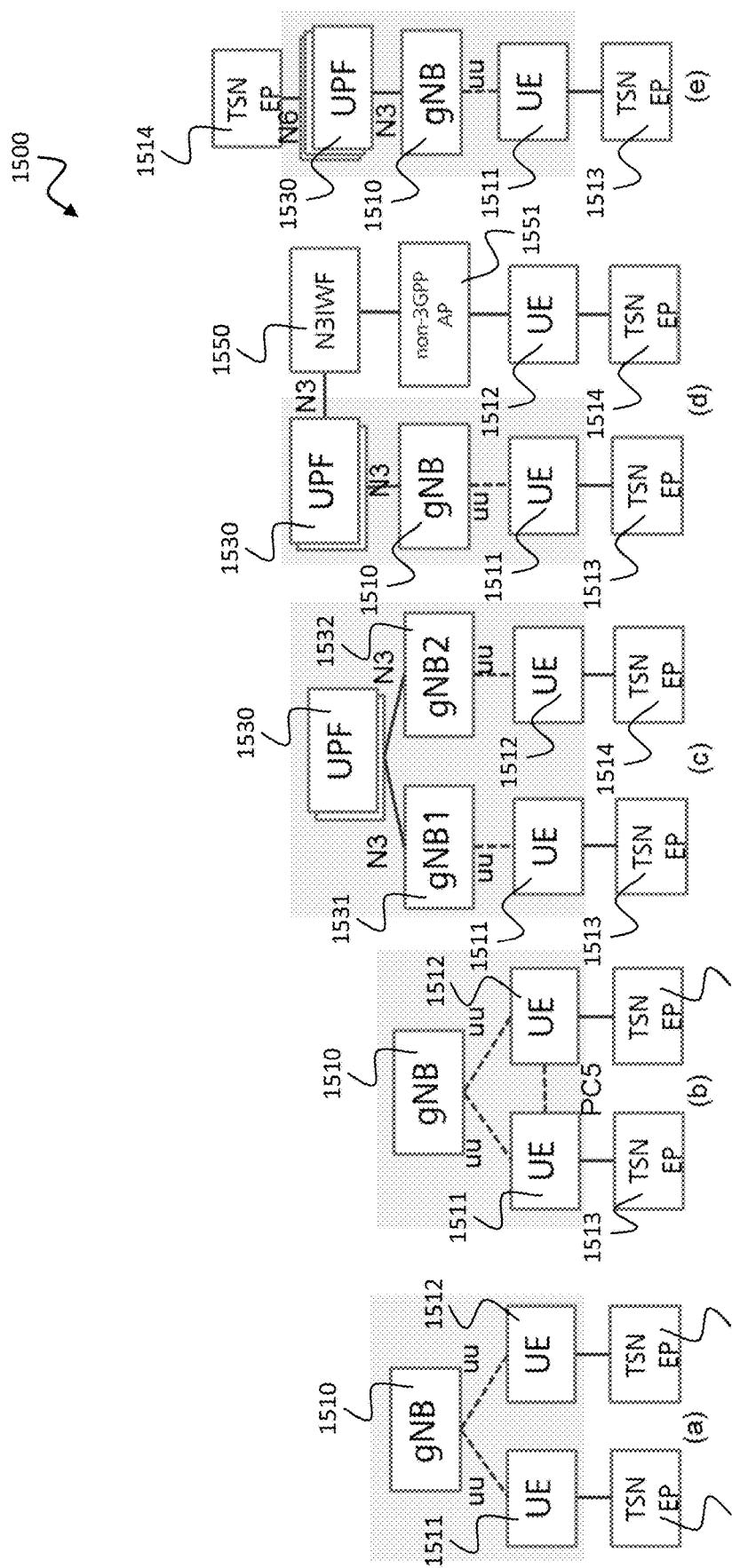
FIG. 15 shows a schematic diagram illustrating exemplary deployment options for 5G and TSN according to the disclosure.

FIG. 15 shows a schematic diagram 1500 illustrating exemplary deployment options for 5G and TSN according to the disclosure, in particular for the TSN-compatible 5G system.

In a first option a), data flows are between first TSN endpoint (EP) 1513, first UE 1511, gNB 1510 via uu interface, second UE 1512 and second TSN EP 1514.

In a second option b), data flows are between first TSN endpoint (EP) 1513, first UE 1511, gNB 1510 via uu interface, second UE 1512 and second TSN EP 1514. Alternatively, sidelink interface PC5 between first UE 1511 and second UE 1512 may be used.

In a third option c), data flows are between first TSN EP 1513, first UE 1511, gNB1 1531 via uu interface, UPF 1530 via N3 interface, gNB2 1532 via N3 interface, second UE 1512 via uu interface and second TSN EP 1514.

In a fourth option d), data flows are between first TSN EP 1513, first UE 1511, gNB 1510 via uu interface, UPF 1530 via N3 interface, N3IWF 1550 via N3 interface, non-3GPP AP 1551, second UE 1512 and second TSN EP 1514.

In a fifth option e), data flows are between first TSN EP 1513, first UE 1511, gNB 1510 via uu interface, UPF 1530 via N3 interface and second TSN EP 1514 via N6 interface.

There are different use cases where the TSN and 5GS needs to be aligned:

The first use cases (according to options a) and b) described above) are with only RAN involvement: Two TSN compliant UEs communicate with each other via the same 5G-RAN node over Uu. Two TSN compliant UEs communicate with each other via PC5.

The second use (according to options c), d) and e) described above) are with both RAN and 5GC involvement: Two TSN compliant UEs communicate with each other via different 5G-RAN node. Two TSN compliant UEs communicate with each other via 5G-RAN node and non-3GPP access. One UE connect to TSN compliant network via 5GS.

These options are depicted in the FIG. 15. Depending on the deployment options, the deterministic QoS profile is passed to and agreed with RAN and/or CN control functions. The RAN and/or CN control functions configure their part of the network accordingly to support the end to end communication of the deterministic traffic.

Figure 16:
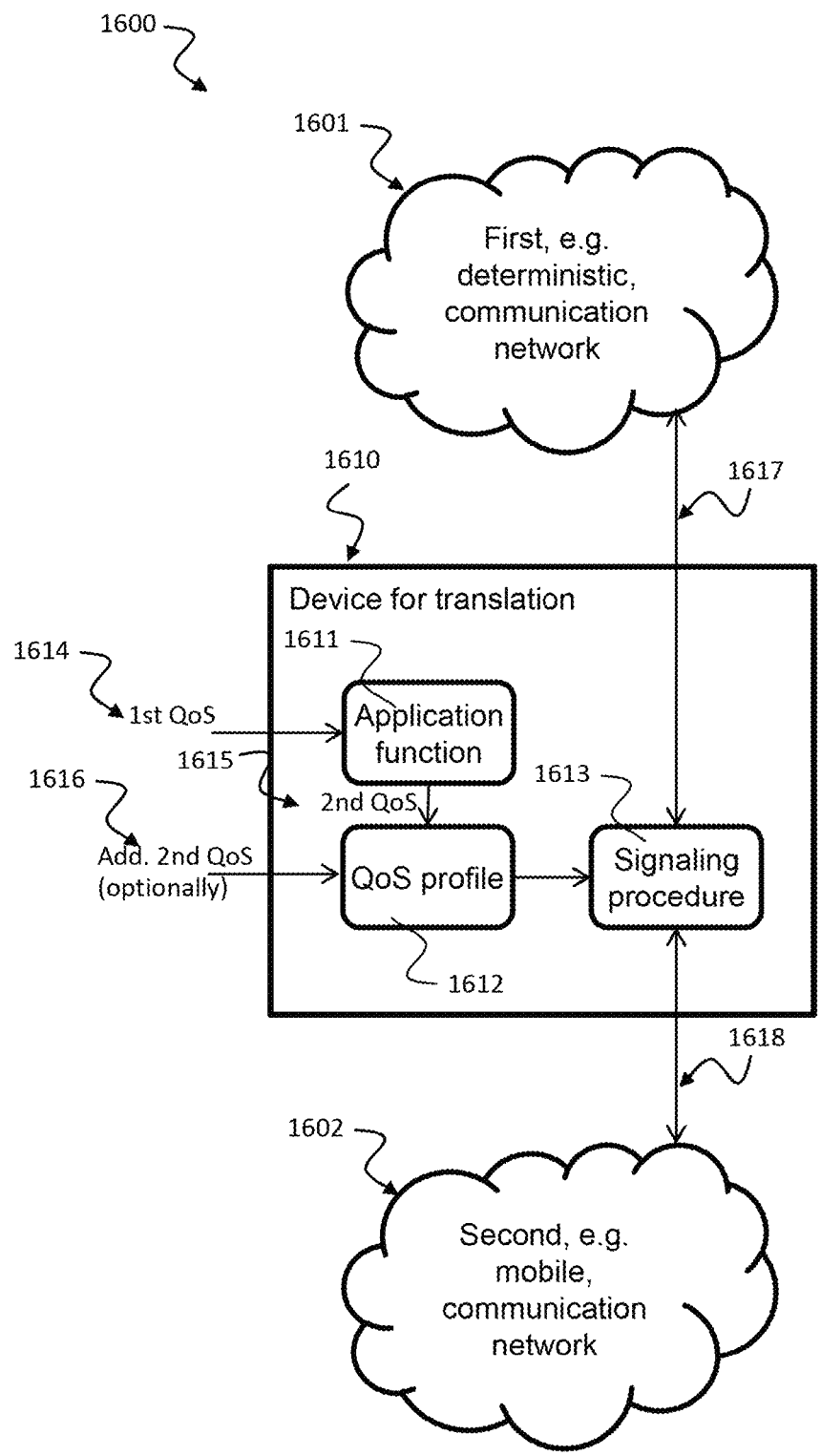
FIG. 16 shows a block diagram illustrating a communication system with interworking network device 1610 translating between a deterministic communication network 1601 and a mobile communication network according to the disclosure.

FIG. 16 shows a block diagram illustrating a communication system 1600 with interworking network device 1610 translating between a deterministic communication network 1601 and a mobile communication network 1602 according to the disclosure.

The communication system 1600 includes a device 1610 for translating between a first communication network 1601, in particular a deterministic communication network, and a second communication network 1602, in particular a mobile communication network, in particular a 5G communication network.

The device 1610 comprises: an application function 1611 that is configured to translate between Quality-of-Service, QoS, parameters 1614 of the first communication network 1601 and QoS parameters 1615 of the second communication network 1602; a QoS profile 1612 comprising the QoS parameters 1614 of the first communication network 1601 translated by the application function 1611 and, optionally, additional QoS parameters 1616 originating from the second communication network 1602; and a signaling procedure 1613 configured to exchange the translated QoS parameters 1615 within the second communication network 1602.

The signaling procedure 1613 may further be configured to trigger establishment of a deterministic traffic flow 1617, 1618 based on the QoS profile 1612.

The application function 1611 may be configured to negotiate the QoS profile 1612 with the second communication network 1602, in particular a policy control function, PCF 404, of the 5G communication network, in order to ensure that the second communication network 1602 can satisfy the QoS parameters 1614 of the first communication network 1601 translated by the application function 1611.

The application function 1611 may translate the negotiated QoS profile 1612 for the first communication network 1601.

The QoS parameters 1614 of the first communication network 1601 may comprise at least one of the following: periodicity of deterministic traffic flow, maximum data rate of the deterministic traffic flow as inferred from a received configuration, in particular, a Gate Parameter Table, data rate variation of the deterministic traffic flow, starting times of the deterministic traffic flow, starting time variation of the deterministic traffic flow, duration the deterministic traffic flow, duration variation of the deterministic traffic flow, reception window of the deterministic traffic flow, e.g. as illustrated in FIGS. 2 and 11.

The application function 1611 may provide an interface to the first communication network 1601, in particular to a configuration entity of the first communication network 1601, for receiving the QoS parameters 1614 of the first communication network 1601. The application function 1611 may provide an interface to the second communication network 1602, in particular to a PCF 404 of the 5G communication network or via a network exposure function, NEF 403, 1301, to the PCF 404 to provide the QoS profile 1612, e.g. as described above with respect to FIGS. 4 and 13.

The application function 1611, 402 may receive an acceptance message 414 from the PCF 404 if the second communication network 1602 can accept the QoS profile 1612, e.g. as described above with respect to FIG. 4. The application function 1611, 402 may transmit a QoS configuration 415 comprising the translated QoS parameters to the first communication network 1601 based on the accepted QoS profile 1612, e.g. as described above with respect to FIG. 4.

The application function 1611, 402 may receive a rejection message 501 and/or a modified QoS profile from the PCF 404 if the second communication network 1602 rejects the QoS profile 1612, e.g. as described above with respect to FIG. 5. The application function 1611, 402 may transmit the rejection message and/or the translated QoS parameters corresponding to the modified QoS profile to the first communication network 1611.

The application function 1611, 402 may transmit a request to the PCF 404, wherein the request comprises the modified QoS profile if the first communication network 1601 confirms the translated QoS parameters 1615 corresponding to the modified QoS profile, e.g. as described above with respect to FIG. 4.

The PCF 404 may signal a policy related to the QoS profile 1612 or at least one modified QoS profile to a Session Management Function, SMF 601, and/or a User Equipment, UE 1401, of the 5G communication network to influence a User Plane Function, UPF 1402, and a Radio Access Network, RAN 801, e.g. as described above with respect to FIGS. 6 and 8.

The PCF 404 may signal the QoS profile 1612 or the modified QoS profile to the SMF 601 to transmit information based on the QoS profile 1612 or the at least one modified QoS profile to a Radio Access Network (RAN) entity 801 to influence resources reservation of the RAN 801, e.g. as described above with respect to FIG. 8. The PCF 404 may receive a message from the SMF 601, the message comprising the QoS profile 1612 or the at least one modified QoS profile accepted by the second communication network 1602 or a rejection by the second communication network 1602, e.g. as described above with respect to FIG. 6.

The first communication network 1601 may comprise Time Sensitive Networking, TSN, in particular according to the IEEE 802.1Qbv specification.

The QoS parameters of the TSN can be derived from Gate Control Lists, GCLs 906, e.g. as described above with respect to FIG. 9, of TSN switches of the TS network 1000 or signaled in alternative format.

The QoS parameters of the TSN 1000 may comprise at least one of the following: time-triggered 1102 or deterministic resource type, absolute time stamp 1103 for start of TSN data flow or a relative time offset to an absolute starting time, optionally a period 1104 of the TSN data flow, and data volume 1105 or data rate of the TSN data flow 1107, 1108, e.g. as described above with respect to FIG. 11.

Figure 17:
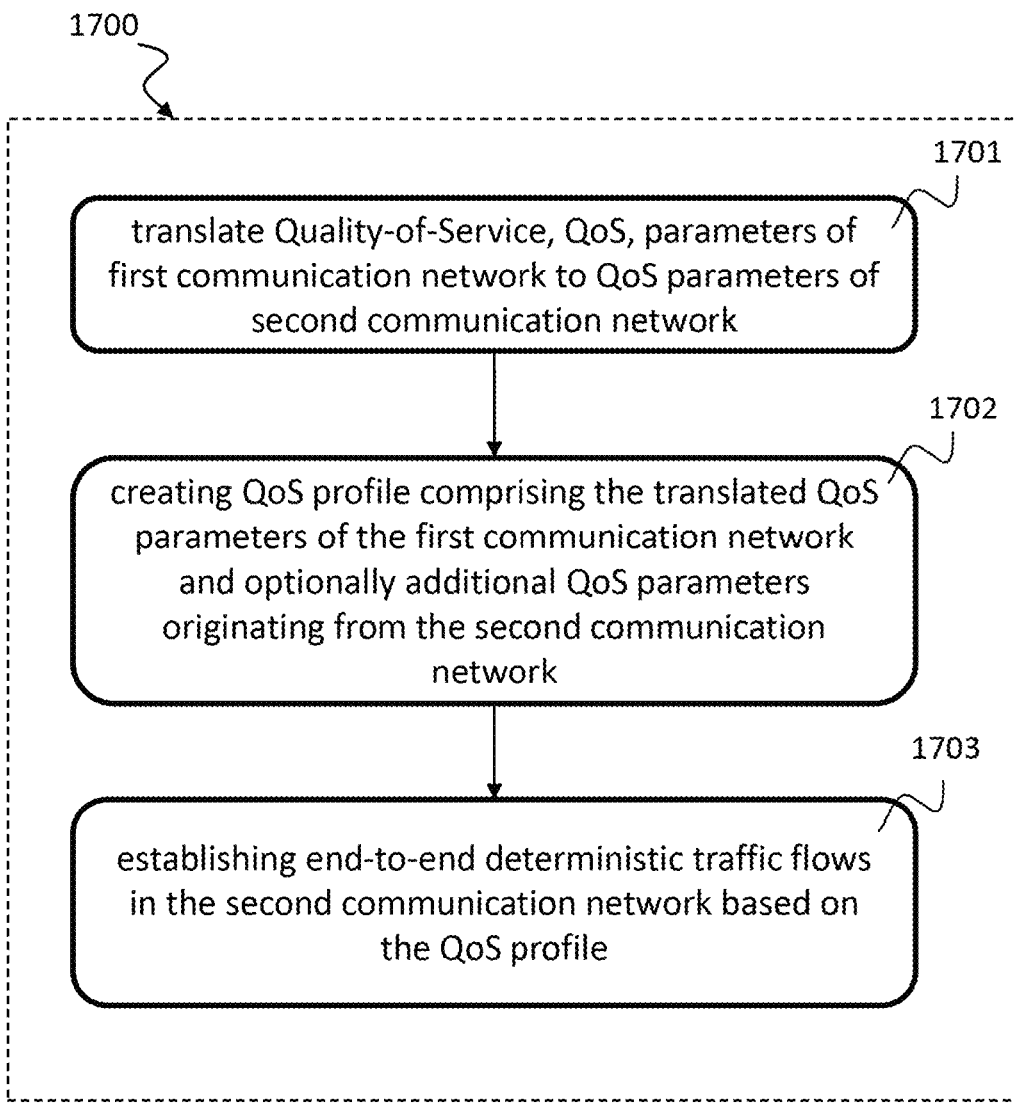
FIG. 17 shows a schematic diagram illustrating a method for translating between a deterministic communication network and a mobile communication network according to the disclosure.

FIG. 17 shows a schematic diagram illustrating a method 1700 for translating between a deterministic communication network and a mobile communication network according to the disclosure. The first communication network 1601 may be a deterministic communication network, and the second communication network 1602 may be a mobile communication network, in particular a 5G communication network as described above with respect to FIG. 16.

The method 1700 comprises: translating 1701 between Quality-of-Service, QoS, parameters 1614 of the first communication network 1601 and QoS parameters 1615 of the second communication network 1602, e.g. as described above with respect to FIG. 16. The method 1700 comprises creating 1702 a QoS profile 1612 comprising the QoS parameters 1614 of the first communication network 1601 translated by the application function 1611 and, optionally, additional QoS parameters 1616 originating from the second communication network 1602, e.g. as described above with respect to FIG. 16. The method 1700 comprises establishing 1703 end-to-end deterministic traffic flows in the second communication network based on the QoS profile, e.g. as described above with respect to FIG. 16. The method 1700 may comprise further steps not shown in FIG. 17, e.g. as described above with respect to FIG. 16.

The present disclosure also supports a computer program product including computer executable code or computer executable instructions that, when executed, causes at least one computer to execute the performing and computing steps described herein, in particular the steps of the method described above. Such a computer program product may include a readable non-transitory storage medium storing program code thereon for use by a computer. The program code may perform the processing and computing steps described herein, in particular the method described above.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. A device for translating quality of service (QoS) between a deterministic communication network and a mobile communication network, wherein the device comprises an application function configured to:
    translate between quality-of-service (QoS) parameters of the deterministic communication network and QoS parameters of the mobile communication network;
    generate a QoS profile comprising the QoS parameters of the deterministic communication network translated by the application function into QoS parameters of the mobile communication network;
    provide the QoS profile to the mobile communication network,
    wherein the QoS parameters of the deterministic communication network comprise at least one of the following:
        a periodicity of a deterministic traffic flow,
        a maximum data rate of the deterministic traffic flow as inferred from a received configuration,
        a data rate variation of the deterministic traffic flow,
        starting times of the deterministic traffic flow,
        a starting time variation of the deterministic traffic flow,
        a duration of the deterministic traffic flow,
        a duration variation of the deterministic traffic flow, or
        a reception window of the deterministic traffic flow.

2. The device of claim 1, wherein the application function is further configured to trigger an establishment of a deterministic traffic flow based on the QoS profile.

3. The device of claim 1, wherein the application function is configured to negotiate the QoS profile with the mobile communication network to ensure that the mobile communication network can satisfy the QoS parameters of the deterministic communication network translated by the application function.

4. The device of claim 3, wherein the application function is configured to translate the negotiated QoS profile for the deterministic communication network.

5. The device of claim 1, wherein the QoS parameters of the first deterministic communication network comprise at least one of the following:
    a periodicity of a deterministic traffic flow,
    a maximum data rate of the deterministic traffic flow as inferred from a received configuration, or
    starting times of the deterministic traffic flow.

6. The device of claim 1, wherein the application function is configured to provide an interface to the deterministic communication network for receiving the QoS parameters of the deterministic communication network, and
    wherein the application function is further configured to provide an interface to the mobile communication network, which comprises providing the interface to a policy control function (PCF) of the mobile communication network or providing the interface via a network exposure function (NEF) to the PCF of the mobile communication network to provide the QoS profile to the mobile communication network.

7. The device of claim 6, wherein the application function is configured to receive an acceptance message from the PCF based upon the mobile communication network accepting the QoS profile, and
    wherein the application function is configured to transmit a QoS configuration comprising the translated QoS parameters to the deterministic communication network based on the accepted QoS profile.

8. The device of claim 6, wherein the application function is configured to receive a rejection message or a modified QoS profile from the PCF based upon the mobile communication network rejecting the QoS profile, and
    wherein the application function is configured to transmit the rejection message or the translated QoS parameters corresponding to the modified QoS profile to the deterministic communication network.

9. The device of claim 8, wherein the application function is configured to transmit a request to the PCF, wherein the request comprises the modified QoS profile in a case where the deterministic communication network confirms the translated QoS parameters corresponding to the modified QoS profile.

10. The device of claim 1, wherein the deterministic communication network is a time sensitive network (TSN).

11. The device of claim 10, wherein the QoS parameters of the TSN are based on gate control lists of TSN switches of the TSN.

12. The device of claim 10, wherein the QoS parameters of the TSN comprise at least one of the following:
    a time-triggered or deterministic resource type, an absolute time stamp for a start of a TSN data flow or a relative time offset to an absolute starting time, a period of the TSN data flow, or a data volume or a data rate of the TSN data flow.

13. A policy control function (PCF) network entity, configured to:
    receive a quality-of-service (QoS) profile from an application function (AF) network entity, wherein the QoS profile comprises QoS parameters of a deterministic communication network translated into QoS parameters of a mobile communication network, and additional QoS parameters originating from the mobile communication network; and
    transmit an acceptance message to the AF network entity upon acceptance of the received QoS profile, wherein the QoS parameters of the deterministic communication network comprise at least one of the following:
a periodicity of a deterministic traffic flow,
a maximum data rate of the deterministic traffic flow as inferred from a received configuration,
a data rate variation of the deterministic traffic flow,
starting times of the deterministic traffic flow,
a starting time variation of the deterministic traffic flow,
a duration of the deterministic traffic flow,
a duration variation of the deterministic traffic flow, or
a reception window of the deterministic traffic flow.

14. The PCF network entity of claim 13, further configured to transmit a modified QoS profile to the AF network entity upon rejection of the received QoS profile.

15. The PCF network entity of claim 14, further configured to transmit a signal indicative of a policy related to the QoS profile or at least one modified QoS profile to a session management function (SMF) network entity.

16. The PCF network entity of claim 15, further configured to:
transmit the QoS profile or the at least one modified QoS profile to the SMF network entity to transmit information based on the QoS profile or the at least one modified QoS profile to a radio access network (RAN) entity to influence resource reservation of the RAN entity; and
receive a message from the SMF network entity, the message comprising the QoS profile or the at least one modified QoS profile accepted by the mobile communication network or a rejection by the mobile communication network.

17. The PCF network entity of claim 13, wherein the PCF network entity is further configured to signal a policy related to the QoS profile or at least one modified QoS profile to a session management function (SMF) or a user equipment (UE) of the mobile communication network to influence a user plane function (UPF) and a radio access network (RAN) entity.

18. The policy control function (PCF) network entity of claim 13, wherein the QoS parameters of the deterministic communication network comprise at least one of the following:
a periodicity of a deterministic traffic flow,
a maximum data rate of the deterministic traffic flow as inferred from a received configuration, or
starting times of the deterministic traffic flow.

19. A session management function (SMF) network entity, configured to:
receive a policy related to a quality-of-service (QoS) profile from a policy control function (PCF) network entity, wherein the QoS profile comprises QoS parameters of a deterministic communication network translated by a device into QoS parameters of a mobile communication network, and additional QoS parameters originating from the mobile communication network; and
select a user plane function (UPF) network entity based on the received policy related to the QoS profile from the PCF network entity,
wherein the QoS parameters of the deterministic communication network comprise at least one of the following:
a periodicity of a deterministic traffic flow,
a maximum data rate of the deterministic traffic flow as inferred from a received configuration,
a data rate variation of the deterministic traffic flow,
starting times of the deterministic traffic flow,
a starting time variation of the deterministic traffic flow,
a duration of the deterministic traffic flow,
a duration variation of the deterministic traffic flow, or
a reception window of the deterministic traffic flow.

20. The SMF network entity of claim 19, further configured to:
receive the QoS profile from the PCF network entity;
modify the QoS profile based on the policy received from the PCF network entity;
transmit the modified QoS profile to a radio access network (RAN) entity to influence resource reservation of the RAN entity or the UPF network entity;
receive a message from the RAN entity or the UPF network entity indicating an acceptance or a rejection of the QoS profile;
transmit information about rules to the RAN entity based on the policy received from the PCF network entity; or
transmit the modified QoS profile or the policy to the UPF network entity.

21. The session management function (SMF) network entity of claim 19, wherein the QoS parameters of the deterministic communication network comprise at least one of the following:
a periodicity of a deterministic traffic flow,
a maximum data rate of the deterministic traffic flow as inferred from a received configuration, or
starting times of the deterministic traffic flow.

22. A radio access network (RAN) entity, configured to:
receive a quality-of-service (QoS) profile or related QoS rules from a session management function (SMF) network entity, wherein the QoS profile comprises QoS parameters of a deterministic communication network translated by a device into QoS parameters of a mobile communication network, and additional QoS parameters originating from the mobile communication network; and
reserve resources of the RAN entity based on the received QoS profile,
wherein the QoS parameters of the deterministic communication network comprise at least one of the following:
a periodicity of a deterministic traffic flow,
a maximum data rate of the deterministic traffic flow as inferred from a received configuration,
a data rate variation of the deterministic traffic flow,
starting times of the deterministic traffic flow,
a starting time variation of the deterministic traffic flow,
a duration of the deterministic traffic flow,
a duration variation of the deterministic traffic flow, or
a reception window of the deterministic traffic flow.

23. The RAN entity of claim 22, further configured to transmit a message to the SMF network entity, wherein the message indicates an acceptance or a rejection of the QoS profile.

24. The radio access network (RAN) entity of claim 22, wherein the QoS parameters of the deterministic communication network comprise at least one of the following:
a periodicity of a deterministic traffic flow,
a maximum data rate of the deterministic traffic flow as inferred from a received configuration, or
starting times of the deterministic traffic flow.

25. A user equipment (UE) of a mobile communication network, the UE being configured to:
transmit a request for a packet data unit (PDU) session establishment to a session management function (SMF) network entity via a network access entity or an access management function (AMF) entity; and
receive a radio resource configuration from the network access entity, wherein the radio resource configuration is based on a quality-of-service (QoS) profile, and wherein the QoS profile comprises QoS parameters of a deterministic communication network translated by an application function network entity into QoS parameters of a mobile communication network, and additional QoS parameters originating from the mobile communication network, wherein the QoS parameters of the deterministic communication network comprise at least one of the following:
a periodicity of a deterministic traffic flow,
a maximum data rate of the deterministic traffic flow as inferred from a received configuration,
a data rate variation of the deterministic traffic flow,
starting times of the deterministic traffic flow,
a starting time variation of the deterministic traffic flow,
a duration of the deterministic traffic flow,
a duration variation of the deterministic traffic flow, or
a reception window of the deterministic traffic flow.

26. The UE of claim 25, further configured to establish an end-to-end deterministic traffic flow in the mobile communication network based on the QoS profile.

27. The user equipment (UE) of claim 25, wherein the QoS parameters of the deterministic communication network comprise at least one of the following:
a periodicity of a deterministic traffic flow,
a maximum data rate of the deterministic traffic flow as inferred from a received configuration, or
starting times of the deterministic traffic flow.

28. A user plane function (UPF) network entity of a mobile communication network, the UPF network entity being an end-to-end traffic flow terminating point in the mobile communication network for enforcing quality-of-service (QoS) rules received by a session management function (SMF), the UPF network entity being configured to:
establish an end-to-end deterministic traffic flow in the mobile communication network based on a QoS profile, wherein the QoS profile comprises QoS parameters of a deterministic communication network translated by an application function network entity into QoS parameters of the mobile communication network, and additional QoS parameters originating from the mobile communication network, wherein the QoS parameters of the deterministic communication network comprise at least one of the following:
a periodicity of a deterministic traffic flow,
a maximum data rate of the deterministic traffic flow as inferred from a received configuration,
a data rate variation of the deterministic traffic flow,
starting times of the deterministic traffic flow,
a starting time variation of the deterministic traffic flow,
a duration of the deterministic traffic flow,
a duration variation of the deterministic traffic flow, or
a reception window of the deterministic traffic flow.

29. The PCF network entity of claim 17, wherein the PCF network entity is further configured to:
signal the QoS profile or the modified QoS profile to the SMF to transmit information based on the QoS profile or the at least one modified QoS profile to the RAN entity to influence resource reservation of the RAN entity; and
receive a message from the SMF, the message comprising the QoS profile or the at least one modified QoS profile accepted by the mobile communication network or a rejection by the mobile communication network.

30. The user plane function (UPF) network entity of claim 28, wherein the QoS parameters of the deterministic communication network comprise at least one of the following:
a periodicity of a deterministic traffic flow,
a maximum data rate of the deterministic traffic flow as inferred from a received configuration, or
starting times of the deterministic traffic flow.

* * * * *

UNITED STATES PATENT AND TRADEMARK OFFICE
CERTIFICATE OF CORRECTION

PATENT NO. : 11,832,123 B2
APPLICATION NO. : 17/176362
DATED : November 28, 2023
INVENTOR(S) : Gangakhedkar et al.

Page 1 of 1

It is certified that error appears in the above-identified patent and that said Letters Patent is hereby corrected as shown below:

In the Claims

Claim 5: Column 28, Line 5: "the first deterministic communication network comprise at" should read -- the deterministic communication network comprise at --.

Signed and Sealed this
Twenty-seventh Day of February, 2024

Katherine Kelly Vidal
*Director of the United States Patent and Trademark Office*